(12) United States Patent
Sblano et al.

(10) Patent No.: US 11,863,064 B2
(45) Date of Patent: *Jan. 2, 2024

(54) NON-REGULATED POWER CONVERTER WITH CURRENT SHARING CONTROL

(71) Applicant: SEMICONDUCTOR COMPONENTS INDUSTRIES, LLC, Phoenix, AZ (US)

(72) Inventors: Michele Sblano, Milan (IT); Saverio De Palma, Milan (IT); Massimiliano Picca, Muggio (IT); Stefano Casula, Sunnyvale, CA (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/450,921

(22) Filed: Oct. 14, 2021

(65) Prior Publication Data

US 2022/0045604 A1 Feb. 10, 2022

Related U.S. Application Data

(63) Continuation of application No. 16/714,158, filed on Dec. 13, 2019, now Pat. No. 11,165,335.

(51) Int. Cl.
*H02M 1/38* (2007.01)
*H02M 3/158* (2006.01)
(Continued)

(52) U.S. Cl.
CPC .............. *H02M 1/38* (2013.01); *H02M 3/077* (2021.05); *H02M 3/158* (2013.01); *H02M 3/01* (2021.05)

(58) Field of Classification Search
CPC ................................................ H02M 3/335–42
See application file for complete search history.

(56) References Cited

U.S. PATENT DOCUMENTS 7,277,305 B2   10/2007   Young et al.
9,124,180 B2   9/2015    Lee et al.
(Continued)

FOREIGN PATENT DOCUMENTS

DE   202017105332 U1   5/2018
EP       0435460 A2    7/1991
(Continued)

OTHER PUBLICATIONS

German Search Report for German Application No. 102020132860. 5, dated Nov. 18, 2021, 8 pages.

*Primary Examiner* — Peter M Novak
(74) *Attorney, Agent, or Firm* — Brake Hughes Bellermann LLP

(57) ABSTRACT

According to an aspect, a non-regulated power converter includes a plurality of switching tank converter (STC) modules configured to be connected in parallel and to a load. The plurality of STC modules includes a first STC module configured to generate a first output current and a second STC module configured to generate a second output current. The first STC module includes an output current (OC) measuring circuit configured to measure a value of the first output current, and a dead time (DT) adjustor configured to compare the value of the first output current with a value of a minimum output current provided by the plurality of STC modules. The DT adjustor is configured to adjust a dead time in response to the value of the first output current being greater than the value of the minimum output current.

20 Claims, 14 Drawing Sheets

(51) Int. Cl.
   *H02M 3/07* (2006.01)
   *H02M 3/00* (2006.01)

(56) References Cited

U.S. PATENT DOCUMENTS

| | | |
|---|---|---|
| 9,917,517 B1 | 3/2018 | Jiang et al. |
| 2005/0286277 A1 | 12/2005 | Kein |
| 2008/0298093 A1 | 12/2008 | Jin et al. |
| 2014/0117878 A1* | 5/2014 | Prodic .................... H05B 45/39 |
| | | 315/307 |
| 2019/0199197 A1 | 6/2019 | Hamada et al. |

FOREIGN PATENT DOCUMENTS

| | | |
|---|---|---|
| TW | 201842724 A | 12/2018 |
| WO | 2014152415 A1 | 9/2014 |

* cited by examiner

NON-REGULATED POWER CONVERTER WITH CURRENT SHARING CONTROL

RELATED APPLICATION

This application claims priority to and is a continuation of U.S. patent application Ser. No. 16/714,158, filed Dec. 13, 2019, now U.S. Pat. No. 11,165,335, which is incorporated herein by reference in its entirety.

TECHNICAL FIELD

This description relates to a power converter with current sharing control.

BACKGROUND

In response to two or more switching tank converter (STC) modules being connected in parallel to a load, the output current from one of the STC modules may begin to diverge from the output current from another STC module. For example, one or more of the STC modules may consume a disproportionate or excessive fraction of the load because of the differences in STC resonant output impedance, the differences in tank resonant frequencies, different temperature distributions, and/or the effects of parasitic elements. The unequal distribution of the output currents among connected STC modules may negatively affect the efficiency of the converter, as well as increase the risk of damage to the converter (e.g., damage that may occur when one or more STC modules provides a higher output current than other STC modules).

SUMMARY

According to an aspect, a non-regulated power converter includes a plurality of switching tank converter (STC) modules configured to be connected in parallel and to a load. The plurality of STC modules includes a first STC module configured to generate a first output current, and a second STC module configured to generate a second output current. The first STC module includes an output current (OC) measuring circuit configured to measure a value of the first output current, and a dead time (DT) adjustor configured to compare the value of the first output current with a value of a minimum output current provided by the plurality of STC modules. The DT adjustor is configured to adjust a dead time in response to the value of the first output current being greater than the value of the minimum output current.

According to some aspects, the non-regulated power converter includes one or more of the following features (or any combination thereof). The DT adjustor is configured to determine a current share (CS) dead time based on a difference of the minimum output current and the first output current, where the DT adjustor is configured to increase the dead time by the CS dead time. The first STC module includes a STC circuit including one or more resonant capacitors, one or more resonant inductors, and a plurality of switches. The STC module includes a control logic configured to generate one or more control signals to control the plurality of switches such that the updated dead time is inserted at an end of an STC phase or at an end of an STC cycle. The updated dead time is a period of time which the plurality of switches are deactivated. The non-regulated power converter includes a current share (CS) interface connected to the plurality of STC modules, where the CS interface is configured to provide the value of the minimum output current with the plurality of STC modules. The CS interface may include a dedicated analog pin, where a voltage on the dedicated analog pin indicates the value of the minimum output current. The CS interface may include one or more digital communication lines connected between the plurality of STC modules. The DT adjustor is configured to obtain the value of the minimum output current via the CS interface. The first STC module includes a current share (CS) circuitry connected to the CS interface, where the CS circuitry is configured to obtain the value of the minimum output current from the CS interface and update the value of the minimum output current to be the value of the first output current in response to the value of the first output current being less than the value of the minimum output current.

According to an aspect, a non-regulated power converter includes a plurality of switching tank converter (STC) modules configured to be connected in parallel and to a load. The plurality of STC modules includes a first STC module configured to generate a first output current, and a second STC module configured to generate a second output current. The non-regulated power converter includes a current share (CS) interface connected to the plurality of STC modules, where the CS interface is configured to provide a value of a minimum output current with the plurality of STC modules, and the value of the minimum output current is a minimum of the first output current and the second output current. The first STC module is configured to increase a dead time in response to a value of the first output current being greater than the value of the minimum output current.

According to some aspects, the non-regulated power converter includes one or more of the above/below features (or any combination thereof). The first STC module includes a STC circuit including one or more resonant capacitors, one or more resonant inductors, and a plurality of switches. The first STC module may include an output current (OC) measuring circuit configured to measure the value of the first output current, where the OC measuring circuit is coupled to an output node of the STC circuit. The first STC module may include a dead time (DT) adjustor configured to compare the value of the first output current with the value of the minimum output current from the CS interface, where the DT adjustor is configured to increase the dead time in response to the value of the first output current being greater than the value of the minimum output current. The first STC module includes a control logic configured to generate control signals for the plurality of switches such that the adjusted dead time is added at an end of an STC phase or an STC cycle, where the adjusted dead time is a period of time which the plurality of switches are deactivated. The first STC module includes a current share (CS) circuitry connected to the CS interface, where the CS circuitry is configured to obtain the value of the minimum output current from the CS interface and update the value of the minimum output current to be the value of the first output current in response to the value of the first output current being less than the value of the minimum output current. The first STC module is configured to convert an input voltage to a first output voltage during a plurality of STC cycles, where the plurality of STC cycles includes a first STC cycle followed by a second STC cycle, and the first STC module is configured to increase the dead time between the first STC cycle and the second STC cycle. The first STC module is configured to convert an input voltage to a first output voltage during a plurality of STC cycles, where an individual STC cycle includes a plurality of STC phases where each STC phase is configured to generate a different resonant frequency. The first STC module is configured to increase the dead time between temporally adjacent STC phases within the individual STC cycle. The first STC module is configured to determine a current share (CS) dead time based on a difference of the minimum output current and the first output current, where the adjusted dead time includes a default dead time plus the CS dead time. The CS interface includes one or more digital serial communication lines connected to the plurality of STC modules. The CS interface includes a dedicated analog pin, where a voltage on the dedicated analog pin indicates the value of the minimum output current.

According to an aspect, a method for controlling a non-regulated power converter includes measuring, by a first switching tank converter (STC) module connected in parallel with a second STC module, a value of a first output current generated by the first STC module, obtaining, by the first STC module, a value of a minimum output current via a current share (CS) interface, comparing, by the first STC module, the value of the first output current with the value of the minimum output current, determining, by the first STC module, a current share (CS) dead time in response to the value of the first output current being greater than the value of the minimum output current, and increasing, by the first STC module, a dead time associated with STC cycles of the first STC module by the determined CS dead time.

According to some aspects, the method may include one or more of the above/below features. The dead time is inserted at an end of an STC cycle or at an end of an STC phase. The method may include comparing, by the second STC module, a second output current generated by the second STC module with the minimum output current from the CS interface, and updating, by the second STC module, the minimum output current on the CS interface to correspond to the second output current in response to the second output current being less than the minimum output current. The determined CS dead time may be proportional to a difference between the first output current and the minimum output current.

The details of one or more implementations are set forth in the accompanying drawings and the description below. Other features will be apparent from the description and drawings, and from the claims.

DETAILED DESCRIPTION

Figure 1A:
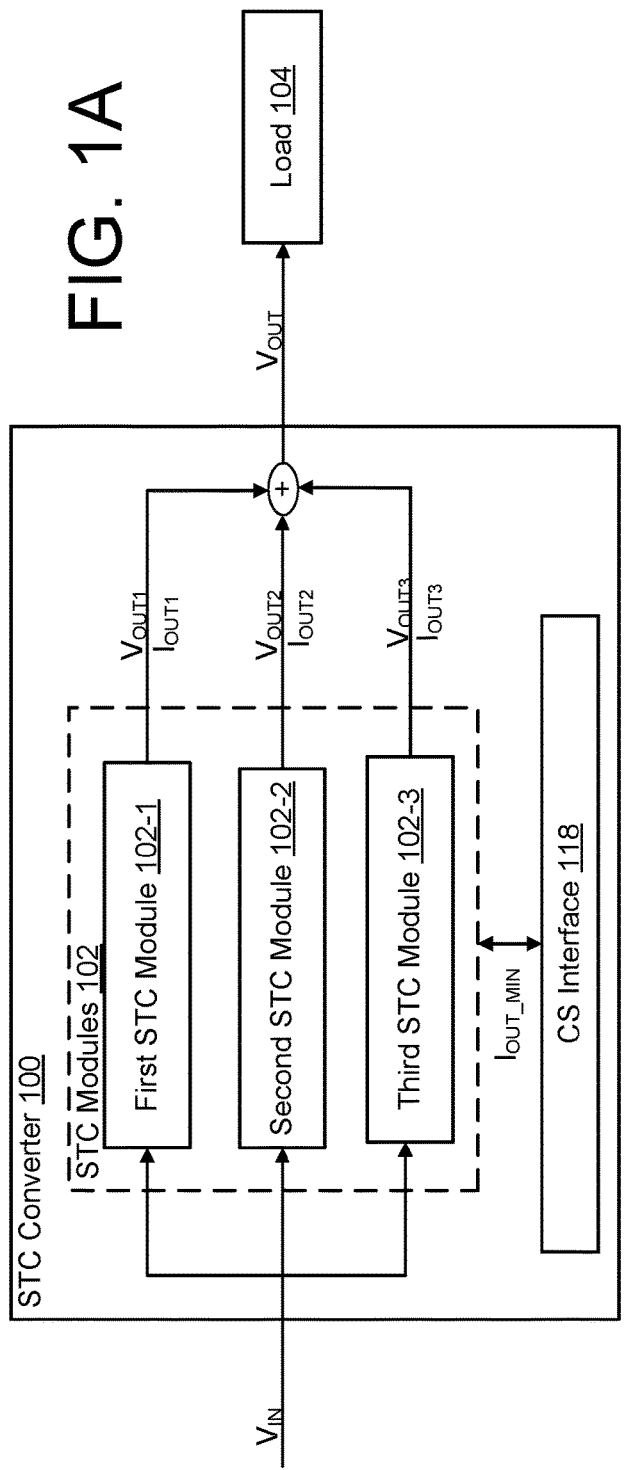
FIG. 1A illustrates a non-regulated power converter having a plurality of switching tank converter (STC) modules according to an aspect.

The following description provides a non-regulated power converter having a plurality of STC modules configured to be connected in parallel to a load, where each STC module is configured to deliver, over time, substantially the same output current despite differences in STC resonant output impedance, differences in tank resonant frequencies, different temperature distributions, and/or the effects of parasitic elements (e.g., resistance, inductance, or capacitance). As a result, the overall efficiency of the non-regulated power converter may be improved, and the risk of damage to the STC module(s) may be reduced or eliminated.

The non-regulated power converter includes a current share (CS) interface connected to the plurality of STC modules. In some examples, each STC module is configured to communicate with the CS interface to obtain a value of the minimum output current provided by the STC modules. If a first STC module generates a first output current, a second STC module generates a second output current, and a third STC module generates a third output current, the value of the minimum output current is the minimum of the first, second, and third output currents. In some examples, the CS interface includes an analog implementation, where the CS interface is a dedicated analog pin connected to the STC modules, and the analog voltage on the dedicated pin indicates the value of the minimum output current. In some examples, the CS interface includes a digital implementation, where the CS interface is one or more digital (serial or parallel) communication lines between the STC modules, where the value of the minimum output current is digitally exchanged among the STC modules.

Each STC module may include a STC circuit (e.g., including one or more resonant tanks), an output current (OC) measuring circuit, a current share (CS) circuitry, a dead time (DT) adjuster, and a control logic. The STC circuit may include one or more resonant capacitors, one or more resonant inductors, one or more filtering capacitors, and a plurality of switches (e.g., transistors). The switches may be controlled by control signals generated by the control logic. Also, the activation/deactivation of the switches may control the STC phases of an STC cycle of a respective STC module, where each STC phase generates a different resonant frequency in the resonant tank(s). In some examples, a particular STC cycle includes four STC phases, e.g., a first STC phase, a second STC phase, a third STC phase, and a fourth STC phase. In some examples, during an individual STC cycle, the first and third STC phases are activated simultaneously, which is followed by the simultaneous activation of the second and fourth STC phases.

Each STC module may provide (and/or update) the value of the minimum output current on the CS interface. For example, the CS circuitry of a respective STC module may compare the value of its output current to the value of the minimum output current on the CS interface, and, if its output current is less than the minimum output current, the CS circuitry may update the value of the minimum output current with the value of the output current. In some examples, the CS circuitry includes one or more analog components. In some examples, the CS circuitry includes one or more digital components.

Each STC module may obtain the value of the minimum output current from the CS interface and compare the value of the minimum output current with its respective output current. For example, the OC measuring circuit of a respective STC module may measure its average output current. If the value of its respective output current is greater than the value of the minimum output current from the CS interface, the STC module may adjust a dead time during the STC cycles. The dead time may be a period of time when the switches of the STC circuit are deactivated. The DT adjustor of a respective STC module may receive the output current from the OC measuring circuit and the minimum output current from the CS interface and adjust the dead time such that the dead time is increased at the end of an STC phase and/or the end of an STC cycle (e.g., after the deactivation of the first/third STC phases, and/or after the deactivation of the second/fourth STC phases). The control logic may receive the updated dead time, and then generate the appropriate control signals for the switches of the STC circuit such that the updated deadtime is implemented at the end of an STC phase and/or STC cycle. The increase of the dead time may cause a reduction in the output current provided by the stronger STC module so that the output currents provided by the STC modules converge towards each other.

Figure 1B:
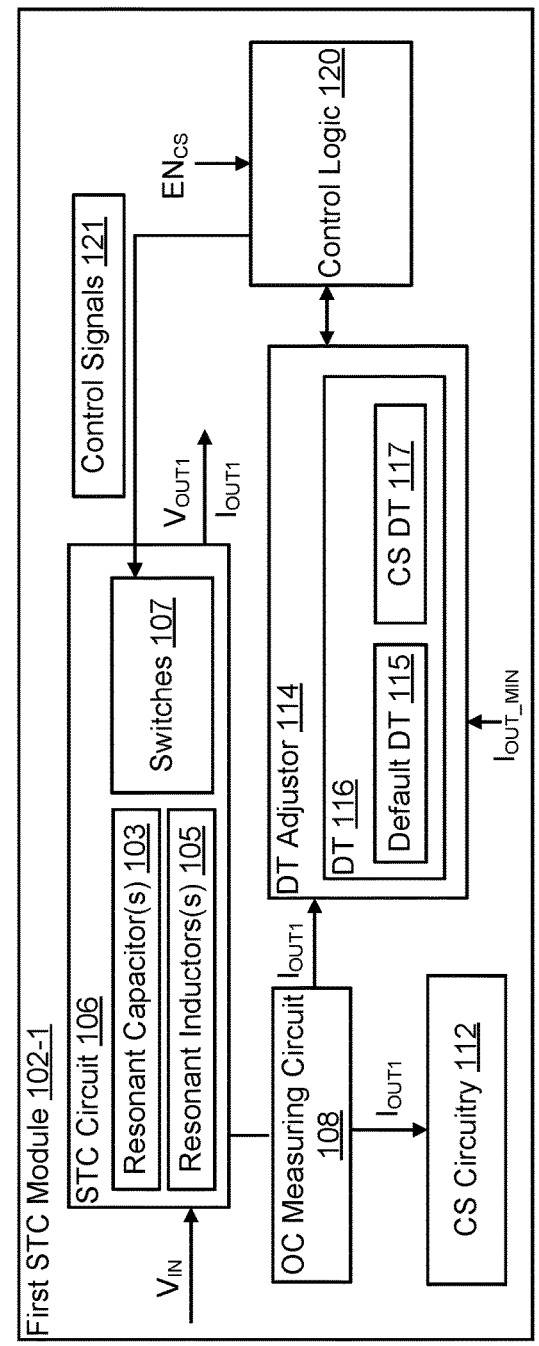
FIG. 1B illustrates an example of a first STC module according to an aspect

FIG. 1A illustrates a non-regulated power converter 100 having a plurality of switching tank converter (STC) modules 102 according to an aspect. FIG. 1B illustrates an example of a first STC module 102-1 according to an aspect. The non-regulated power converter 100 may control the output currents provided by the STC modules 102 such that each STC module 102 is configured to deliver, over time, substantially the same current to a load 104 (e.g., $I_{OUT1}$, $I_{OUT2}$, and $I_{OUT3}$ being substantially the same). For example, for an STC module 102 that is providing more output current than other STC modules 102, a current share (CS) dead time 117 may be added to a dead time 116 at the end of an STC cycle and/or end of an STC phase, where the addition of the CS dead time 117 may cause a reduction in the output current provided by the stronger STC module 102 so that the output currents provided by the STC modules 102 converge towards each other.

The non-regulated power converter 100 may receive an input voltage ($V_{IN}$) and generate an output voltage ($V_{OUT}$). The non-regulated power converter 100 may also be referred to as an STC converter. The STC converter may not include a voltage feedback loop. The non-regulated power converter 100 may scale down the input voltage ($V_{IN}$) by a ratio N, where N is an integer number and may depend on the circuit topology of the non-regulated power converter 100 (e.g., the output voltage ($V_{OUT}$) is $V_{IN}/N$). For example, if the value of N is four, the output voltage ($V_{OUT}$) of the non-regulated power converter 100 is $V_{IN}/4$. However, the value of N may encompass any integer.

As shown in FIG. 1A, the STC modules 102 are connected in parallel with respect to each other. For example, each of the STC modules 102 receives the input voltage ($V_{IN}$), and the outputs of the STC modules 102 are coupled to the load 104. Each STC module 102 may be considered a distinct power stage that converts the input voltage ($V_{IN}$) to a respective output voltage. The STC modules 102 may include a first STC module 102-1, a second STC module 102-2, and a third STC module 102-3. Although three STC modules 102 are shown with respect to FIG. 1A, the non-regulated power converter 100 may include any number of STC modules 102 such as two STC modules 102 or more than three STC modules 102 connected in parallel.

The first STC module 102-1 may receive the input voltage ($V_{IN}$) and convert the input voltage ($V_{IN}$) to a first output voltage ($V_{OUT1}$) with a first output current ($I_{OUT1}$). The second STC module 102-2 may receive the input voltage ($V_{IN}$) and convert the input voltage ($V_{IN}$) to a second output voltage ($V_{OUT2}$) with a second output current ($I_{OUT2}$). The third STC module 102-3 may receive the input voltage ($V_{IN}$) and convert the input voltage ($V_{IN}$) to a third output voltage ($V_{OUT3}$). As further discussed below, the non-regulated power converter 100 may implement an output current control mechanism that enables the output currents (e.g., $I_{OUT1}$, $I_{OUT2}$, $I_{OUT3}$) to be substantially equal to each other. In some examples, the output current control mechanism is activated in response to a current share (CS) enable signal ($EN_{CS}$).

The details of the first STC module 102-1 are shown with respect to FIG. 1B. However, it is noted that the second STC module 102-2 and the third STC module 102-3 (or any other STC module 102) may be the same as the first STC module 102-1 and may include any of the details as discussed herein. Each STC module 102 may receive, via a current share (CS) interface 118, a value of a minimum output current ($I_{OUT\_MIN}$). The value of the minimum output current ($I_{OUT\_MIN}$) may indicate the value of the minimum output current provided by the STC modules 102 (e.g., the value of the minimum of $I_{OUT1}$, $I_{OUT2}$, $I_{OUT3}$). Each STC module 102 may compare the value of the minimum output current ($I_{OUT\_MIN}$) to its respective output current. For example, the first STC module 102-1 compares the value of the minimum output current ($I_{OUT\_MIN}$) with the value of the first output current ($I_{OUT1}$). The second STC module 102-2 compares the value of the minimum output current ($I_{OUT\_MIN}$) with the value of the second output current ($I_{OUT2}$). The third STC module 102-3 compares the value of the minimum output current ($I_{OUT\_MIN}$) with the value of the third output current ($I_{OUT3}$).

With respect to a particular STC module, if the output current is greater than the minimum output current ($I_{OUT\_MIN}$), the STC module 102 may adjust the dead time 116 so that currents provided by the STC modules 102 are more equally balanced. In some examples, the dead time 116 is a default dead time 115, but when the value of the output current is greater than the value of the minimum output current ($I_{OUT\_MIN}$), the dead time 116 is updated to include the CS dead time 117 plus the default dead time 115.

When STC modules 102 are connected in parallel to boost current capability, due to the differences in STC resonant output impedance, tank resonant frequency, and/or because of parasitic elements in the non-regulated power converter 100, one or more STC modules 102 may provide current higher than the current provided by other STC modules 102. However, according to the embodiments discussed herein, if a particular STC module 102 is generating an output current greater than the minimum output current ($I_{OUT\_MIN}$), in order to decrease the amount of output current for the stronger STC module 102, the STC module 102 may increase the dead time 116 (e.g., add the CS dead time 117 to the default dead time 115). In some examples, the STC module 102 may increase the dead time 116 at the end of an STC cycle (e.g., between STC cycles) and/or at the end of each STC phase, which may cause the output current to decrease towards the minimum output current ($I_{OUT\_MIN}$) and/or increase the minimum output current (IOUT_MIN) such that all the STC modules 102 provide substantially the same current.

For example, the first STC module 102-1 may receive the value of the minimum output current ($I_{OUT\_MIN}$) via the CS interface 118. In some examples, the value of the minimum output current ($I_{OUT\_MIN}$) is analog data (e.g., within an analog format). In some examples, the value of the minimum output current ($I_{OUT\_MIN}$) is digital data (e.g., within a digital format). The value of the minimum output current ($I_{OUT\_MIN}$) indicates the value of the minimum output current provided by the STC modules 102 (e.g., minimum of the first output current ($I_{OUT1}$), the second output current ($I_{OUT2}$), and the third output current ($I_{OUT3}$)). In other words, the minimum output current ($I_{OUT\_MIN}$) may be the value of the minimum output current supplied to the load 104 by the weakest STC module 102. For example, if the first output current ($I_{OUT1}$) is 25A, the second output current ($I_{OUT2}$) is 24A, and the third output current ($I_{OUT3}$) is 23A, the minimum output current ($I_{OUT\_MIN}$) is 23A (e.g., where the third STC module 102-3 is considered the weakest STC module 102).

The CS interface 118 may be one or more components (e.g., analog and/or digital) configured to share the minimum output current ($I_{OUT\_MIN}$) with each of the STC modules 102. In some examples, the CS interface 118 includes one or more analog components configured to provide the minimum output current ($I_{OUT\_MIN}$) in an analog format to the STC modules 102. In some examples, the CS interface 118 includes a dedicated pin (e.g., an external pin or a pin external to the STC modules 102), where each STC module 102 is connected to the dedicated pin. The voltage level (e.g., analog voltage level) on the dedicated pin may indicate the amount of the minimum output current ($I_{OUT\_MIN}$). In some examples, the first STC module 102-1 may obtain the minimum output current ($I_{OUT\_MIN}$) from the dedicated pin.

In some examples, the CS interface 118 includes one or more digital components configured to provide the minimum output current ($I_{OUT\_MIN}$) in a digital format to the STC modules 102. In some examples, the CS interface 118 includes one or more digital communication lines that share the minimum output current ($I_{OUT\_MIN}$) among the STC modules 102. In some examples, the digital communication line(s) define a digital serial interface. In some examples, the digital communication line(s) define a parallel interface. The first STC module 102-1, the second STC module 102-2, and the third STC module 102-3 may be connected to each other via the digital communication line(s).

In further detail, the first STC module 102-1 may receive the minimum output current ($I_{OUT\_MIN}$) from the third STC module 102-3 via the digital communication line(s), and if the value of the first output current ($I_{OUT1}$) is less than the value of the minimum output current ($I_{OUT\_MIN}$), the first STC module 102-1 may update the value of the minimum output current ($I_{OUT\_MIN}$) with the value of the first output current ($I_{OUT1}$). Then, the second STC module 102-2 may receive the minimum output current ($I_{OUT\_MIN}$) from the first STC module 102-1 via the digital communication line(s), and, if the value of the second output current ($I_{OUT2}$) is less than the value of the minimum output current ($I_{OUT\_MIN}$), the second STC module 102-2 may update the value of the minimum output current ($I_{OUT\_MIN}$) with the value of the second output current ($I_{OUT2}$). Then, the third STC module 102-3 may receive the minimum output current ($I_{OUT\_MIN}$) from the second STC module 102-2 via the digital communication line(s), and, if the value of the third output current ($I_{OUT3}$) is less than the value of the minimum output current ($I_{OUT\_MIN}$), the third STC module 102-3 updates the value of the minimum output current ($I_{OUT\_MIN}$) with the value of the third output current ($I_{OUT3}$), and the process continues as so forth.

As shown in FIG. 1B, the first STC module 102-1 includes a STC circuit 106 that receives the input voltage ($V_{IN}$) and generates the first output voltage ($V_{OUT1}$) with the first output current ($I_{OUT1}$). The STC circuit 106 may include one or more resonant tanks that absorb power at one or more frequencies (e.g., resonant frequencies). The STC circuit 106 may include one or more resonant capacitors 103, one or more resonant inductors 105, and switches 107. The STC circuit 106 may define any number of resonant branches. The switches 107 may be activated (e.g., conducting) or deactivated (e.g., not conducting) based on control signals 121, which controls the STC phases of the STC cycles.

The first STC module 102-1 includes an output current (OC) measuring circuit 108, a current comparator 110, current share (CS) circuitry 112, a dead time (DT) adjustor 114, and control logic 120. The OC measuring circuit 108 is coupled to the STC circuit 106. In some examples, the OC measuring circuit 108 is coupled to an output node of the STC circuit 106. The OC measuring circuit 108 may measure (or detect) an average of the first output current ($I_{OUT1}$). The OC measuring circuit 108 may include one or more electrical components configured to obtain the level (or average) of the first output current ($I_{OUT1}$). In some examples, the OC measuring circuit 108 includes a resistor (e.g., a shunt resistor). In some examples, the OC measuring circuit 108 includes a current sense circuit. For example, the OC measuring circuit 108 may read the drain-to-source voltage of switching transistor(s) connected to the output voltage or ground and generate a signal proportional to the STC output current.

The CS circuitry 112 may be coupled to the OC measuring circuit 108. The CS circuitry 112 may communicate with the CS interface 118 to obtain the value of the minimum output current ($I_{OUT\_MIN}$). In some examples, the CS circuitry 112 may obtain the value of the minimum output current ($I_{OUT\_MIN}$) from a memory device at the CS circuitry 112. In some examples, the CS circuitry 112 may determine whether the first output current ($I_{OUT1}$) is the minimum output current provided by the STC modules 102, and, if so, may provide the first output current ($I_{OUT1}$) as the value of the minimum output current ($I_{OUT\_MIN}$) on the CS interface 118. In some examples, the CS circuitry 112 includes one or more analog components such as a comparator and one or more transistors. In some examples, the CS circuitry 112 includes one or more digital components such as one or more digital processors and one or more memory devices that include executable instructions that when executed by the digital processors are configured to evaluate whether the first output current ($I_{OUT1}$) is greater than the minimum output current ($I_{OUT\_MIN}$), and, depending on the results, provide or update the minimum output current ($I_{OUT\_MIN}$) on the CS interface 118.

The DT adjustor 114 may receive the minimum output current ($I_{OUT\_MIN}$) from the CS interface 118 and the first output current ($I_{OUT1}$) from the OC measuring circuit 108. The DT adjustor 114 may compare the value of the first output current ($I_{OUT1}$) with the value of the minimum output current ($I_{OUT\_MIN}$). If the results of the comparison indicate that the value of the first output current ($I_{OUT1}$) is greater than the value of the minimum output current ($I_{OUT\_MIN}$), the DT adjustor 114 may adjust the dead time 116 to be implemented at the end of the next STC phase or end of the next STC cycle. If the results of the comparison indicate that the value of the first output current ($I_{OUT1}$) is equal to or less than the value of the minimum output current ($I_{OUT\_MIN}$), the DT adjustor 114 may not adjust the dead time 116.

In some examples, if the value of the first output current ($I_{OUT1}$) is greater than the value of the minimum output current ($I_{OUT\_MIN}$), the DT adjustor 114 may determine (or compute) the CS dead time 117. The DT adjustor 114 may compute the CS dead time 117 based on the difference between the value of the first output current ($I_{OUT1}$) and the value of the minimum output current ($I_{OUT\_MIN}$). In some examples, the DT adjustor 114 may compute the CS dead time 117 based on the following equation: CS DT=K*($I_{OUT1}$−$I_{OUT\_MIN}$), where the parameter K is a scaling parameter. As such, the value of the CS dead time 117 may be proportional to the difference between the first output current ($I_{OUT1}$) and the minimum output current ($I_{OUT\_MIN}$) (e.g., the larger the difference, the larger the CS dead time 117). The CS dead time 117 may be an additional period of time, which is added to the default dead time 115. For example, if the value of the first output current ($I_{OUT1}$) is equal to or less than the value of the minimum output current ($I_{OUT\_MIN}$), the dead time 116 includes only the default dead time 115 (e.g., no adjustment takes place). However, if the value of the first output current ($I_{OUT1}$) is greater than the value of the minimum output current ($I_{OUT\_MIN}$), the dead time 116 includes the default dead time 115 plus the computed CS dead time 117.

In some examples, the DT adjustor 114 includes an analog circuit having one or more analog components such as an operational transconductance amplifier (OTA) that sinks current from a (dead time) delay ramp. In some examples, the DT adjustor 114 includes comparator(s), transistor(s), capacitor(s), delay(s), and/or other analog components. In some examples, the DT adjustor 114 includes a digital circuit having one or more digital components such as register(s), analog-to-digital converter(s) (ADCs), serial to parallel (S/P) converter(s), parallel to serial (P/S) converter(s), and/or one or more digital processors. In some examples, the DT adjustor 114 includes a combination of one or more analog components and one or more digital components.

The control logic 120 may generate control signals 121 to enable or disable the STC phases of the STC cycles of the first STC module 102-1. In some examples, the control logic 120 (and/or the DT adjustor 114) receives the CS enable signal ($EN_{CS}$) which activates the current share control mechanism discussed herein. For example, if the CS enable signal ($EN_{CS}$) is in a first state (e.g., a low state), the current share control mechanism is deactivated, and the dead time 116 includes the fixed value of the default dead time 115. However, if the CS enable signal ($EN_{CS}$) is in a second state (e.g., a high state), the current share control mechanism is activated, and the dead time 116 may be adjusted to additionally include the CS dead time 117. In some examples, the control signals 121 may activate/deactivate the switches 107 of the STC circuit 106 to control the activation/deactivation of the STC phases. The control logic 120 may be connected to the DT adjustor 114. Also, in some examples, it is noted that some functionality of the DT adjustor 114 may be included in the control logic 120 (or vice versa). The control logic 120 receives the dead time 116 from the DT adjustor 114 and is configured to generate the control signals 121 to control the switches 107 such that the updated dead time 116 is inserted between STC cycles or between STC phases of an STC cycle.

Figure 2:
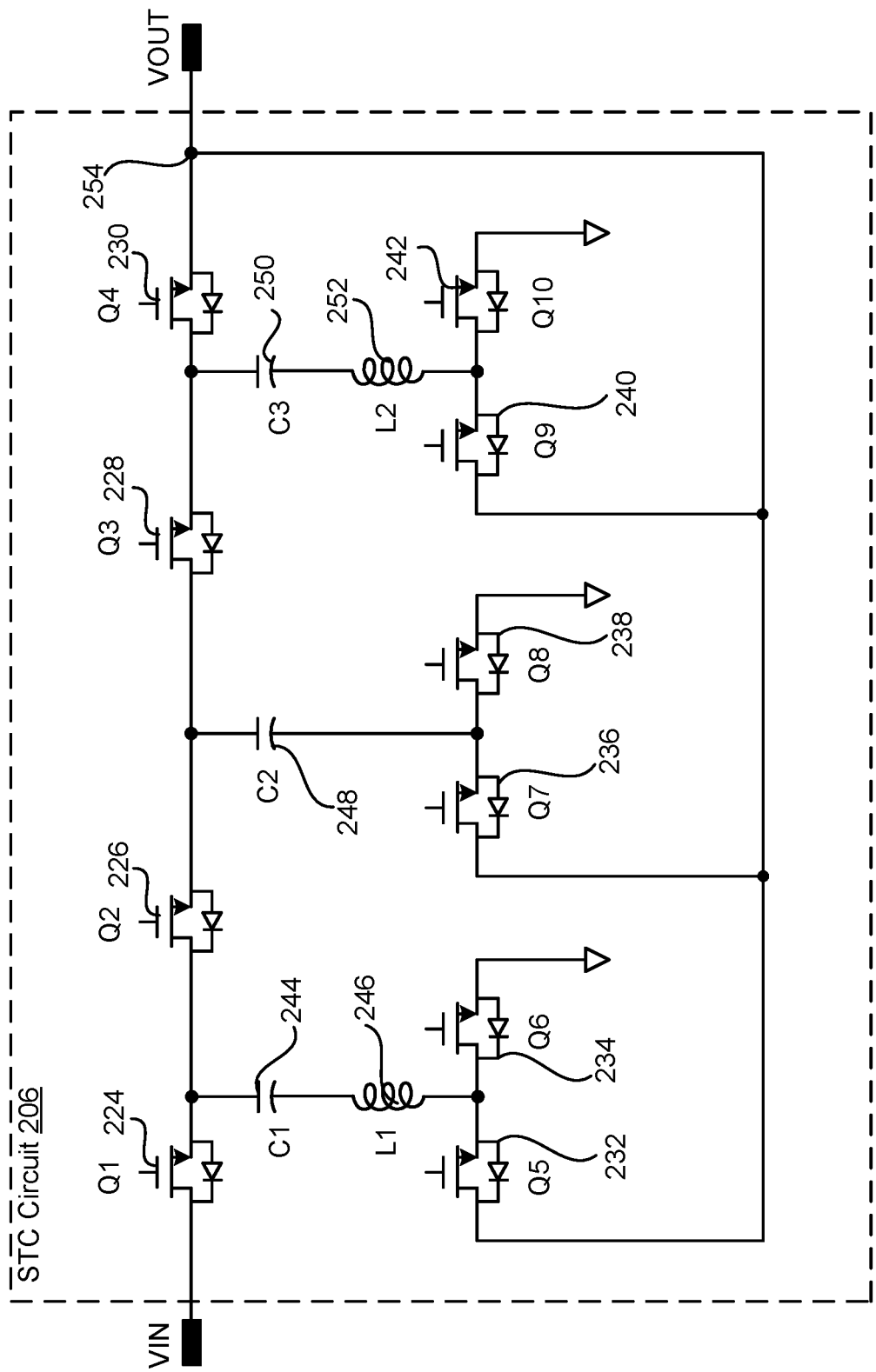
FIG. 2 illustrates an example of an STC circuit of an STC module according to an aspect.

FIG. 2 illustrates an example of a STC circuit 206 according to an aspect. The STC circuit 206 may be an example of the STC circuit 106 of FIG. 1B and may include any of the detailed discussed herein. The STC circuit 206 is not a voltage regulator (e.g., a non-regulated power converter), and therefore does not include a voltage feedback loop. The STC circuit 206 may convert the input voltage ($V_{IN}$) by a ratio N, where N is an integer number that depends on the circuit topology. In some examples, N is four (e.g., $V_{OUT}$=$V_{IN}$/4). However, N may be any integer.

As shown in FIG. 2, the STC circuit 206 includes a resonant capacitor 244 (C1), a resonant inductor 246 (L1), a filtering capacitor 248 (C2), a resonant capacitor 250 (C3), and a resonant inductor 252 (L2). Also, the STC circuit 206 includes switch 224 (Q1), switch 226 (Q2), switch 228 (Q3), switch 230 (Q4), switch 232 (Q5), switch 234 (Q6), switch 236 (Q7), switch 238 (Q8), switch 240 (Q9), and switch 242 (Q10). Each of the switches may be a transistor (e.g., a field-effect transistor (FET), a metal-oxide-semiconductor FET (MOSFET), a bipolar junction transistor (BJT), or other types of transistors). In some examples, the gates of the switches are configured to receive control signal (e.g. the control signals 121 of FIG. 1B) to activate or deactivate the switches. The STC circuit 206 may operate in a number of STC phases such as a first STC phase, a second STC phase, a third STC phase and a fourth STC phase, which may be controlled by the switches in FIG. 2.

In the first STC phase, the switch 224 (Q1), and the switch 232 (Q5) are activated. In the second STC phase, the switch 226 (Q2), the switch 234 (Q6), and the switch 236 (Q7) are activated. In the third STC phase, the switch 228 (Q3), the switch 238 (Q8), and the switch 240 (Q9) are activated. In the fourth STC phase, the switch 230 (Q4) and the switch 242 (Q10) are activated. In some examples, the first STC phase and the third STC phase are simultaneously activated. In some examples, the second STC phase and the fourth STC phase are simultaneously activated.

The resonant frequencies of the STC circuit 206 may be Frequency (Phase 1)=1/(2*pi*sqrt(C1*L1)), Frequency (Phase 2)=1/(2*pi*sqrt((C1*C2/(C1+C2))*L1)), Frequency (Phase 3)=1/(2*pi*sqrt((C3*C2/(C3+C2))*L2)), Frequency (Phase 4)=1/(2*pi*sqrt(C3*L2)). In the example of FIG. 2, the STC circuit 206 has a ratio value (N) of 4, where the input voltage ($V_{IN}$) is divided by 4 (e.g., the first output voltage ($V_{OUT1}$) is ¼ of the input voltage ($V_{IN}$)). However, the techniques discussed herein may be applied to an STC circuit 206 having any ratio value N.

An STC cycle includes the activation of the first STC phase and the third STC phase (at the same time) for a first period of time followed by the activation of the second STC phase and the fourth STC phase (at the same time) for a second period of time. In some examples, a dead time (e.g., the dead time 116 of FIG. 1B) exists between the first period of time and the second period of time (e.g., a dead time between STC phases within a single STC cycle).

During the dead time, all switches in the STC circuit 206 are deactivated. In some examples, during the dead time, one or more of the switches in the STC circuit 206 are deactivated (but one or more switches remain activated). For example, the dead time may be inserted to avoid cross conduction and allow current to be properly discharged to OA (to enable zero current switching and/or zero voltage switching, thereby providing high efficiency). Also, in some examples, a dead time (e.g., the dead time 116 of FIG. 1B) exists before the activation of a subsequent STC cycle (e.g., a dead time between consecutive STC cycles). As further discussed below, referring to FIG. 1B, in response to the value of the first output voltage ($V_{OUT1}$) being greater than the value of the minimum output current ($I_{OUT\_MIN}$), the first STC module 102-1 may increase the dead time 116 between the STC phases and/or increase the dead time 116 at the end of the STC cycle (and before the subsequent STC cycle).

Figure 3:
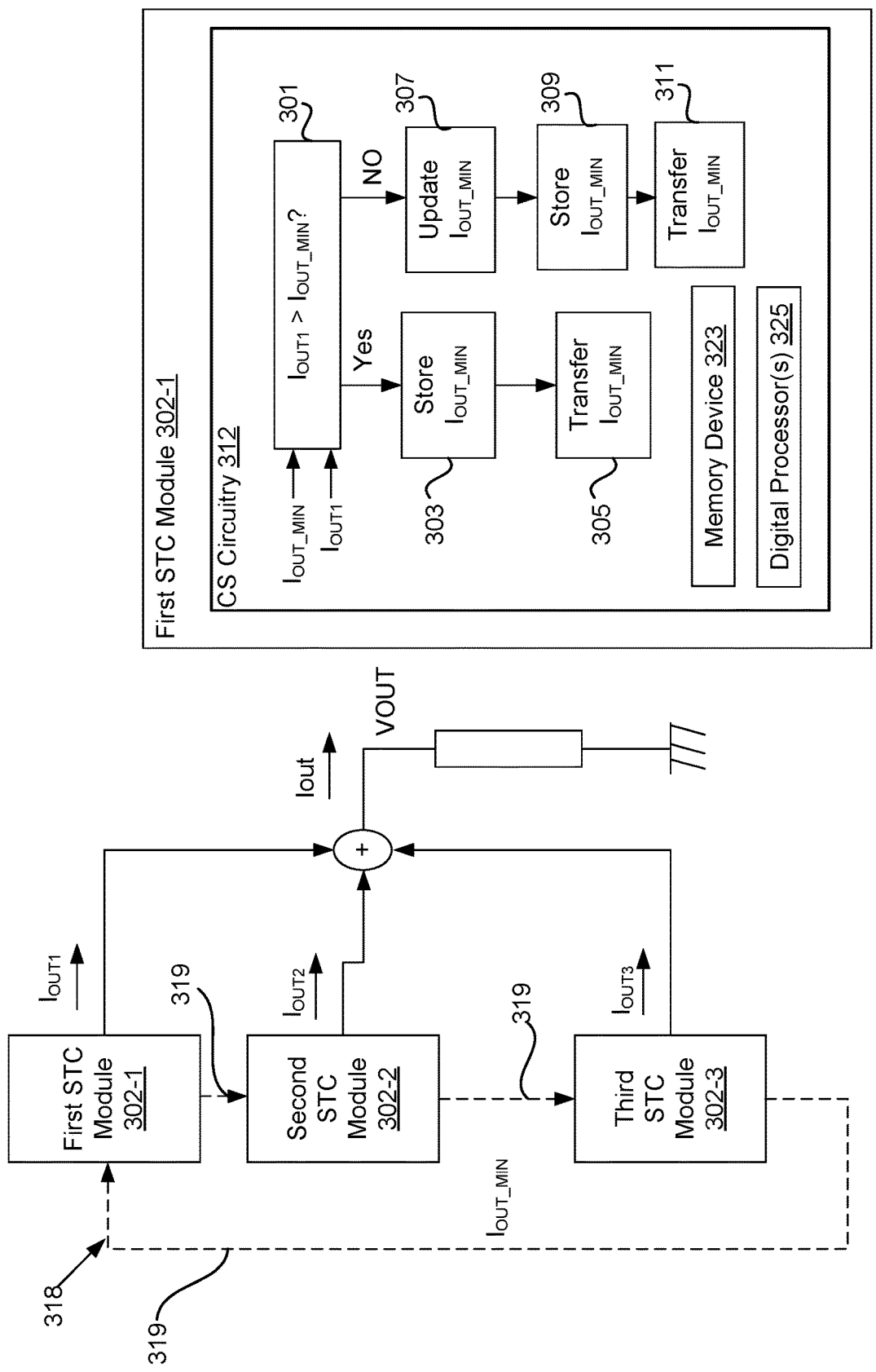
FIG. 3A illustrates a digital implementation of a current share (CS) interface of the non-regulated power converter according to an aspect.
FIG. 3B illustrates an example of a current share (CS) circuitry of the STC module according to an aspect.

FIG. 3A illustrates a digital implementation of a current share (CS) interface 318 among a first STC module 302-1, a second STC module 302-2, and a third STC module 302-3. FIG. 3B illustrates an example of a current share (CS) circuitry 312 of the first STC module 302-1 according to an aspect. The CS interface 318 may be an example of the CS interface 118 of FIG. 1A, and the first STC module 302-1, the second STC module 302-2, and the third STC module 302-3 may be the first STC module 102-1, the second STC module 102-2, and the third STC module 102-3 of FIG. 1A, respectively, and may include any of the details discussed herein.

The CS interface 318 may be a digital serial interface that enables the first STC module 302-1, the second STC module 302-2, and the third STC module 302-3 to communicate in order to share the minimum output current ($I_{OUT\_MIN}$). The CS interface 318 includes one or more digital communication lines 319 connected between the first STC module 302-1, the second STC module 302-2, and the third STC module 302-3. In some examples, the digital communication lines 319 define a digital serial interface that is configured to serially transmit digital data among the STC modules.

With respect to FIG. 3B, the CS circuitry 312 includes a memory device 323 and one or more digital processors 325 configured to execute operations of the CS circuitry 312. For example, in operation 301, the CS circuitry 312 may determine whether the value of the first output current ($I_{OUT1}$) is greater than the value of the minimum output current ($I_{OUT\_MIN}$). If yes, in operation 303, the CS circuitry 312 may store the value of the minimum output current ($I_{OUT\_MIN}$) in the memory device 323, and, in operation 305, the CS circuitry 312 may transfer the digital value of the minimum output current ($I_{OUT\_MIN}$), via the digital communication line(s) 319, to the second STC module 302-2. If no, in operation 307, the CS circuitry 312 may update the value of the minimum output current ($I_{OUT\_MIN}$) with the first output current ($I_{OUT1}$), and, in operation 309, the CS circuitry 312 may store the updated value of the minimum output current ($I_{OUT\_MIN}$) in the memory device 323. Then, in operation 311, the CS circuitry 312 may transfer the updated digital value of the minimum output current ($I_{OUT\_MIN}$), via the digital communication line(s) 319, to the second STC module 302-2.

The second STC module 302-2 may include the CS circuitry 312 and may perform the same operations, which, as shown in FIG. 3A, the second STC module 302-2 may transfer the digital value of the minimum output current ($I_{OUT\_MIN}$) to the third STC module 302-3 via the digital communication line(s) 319. The third STC module 302-3 may include the CS circuitry 312 and may perform the same operations, which, as shown in FIG. 3A, the third STC module 302-3 may transfer the digital value of the minimum output current ($I_{OUT\_MIN}$) to the first STC module 302-1 via the digital communication line(s) 319.

Figure 4:
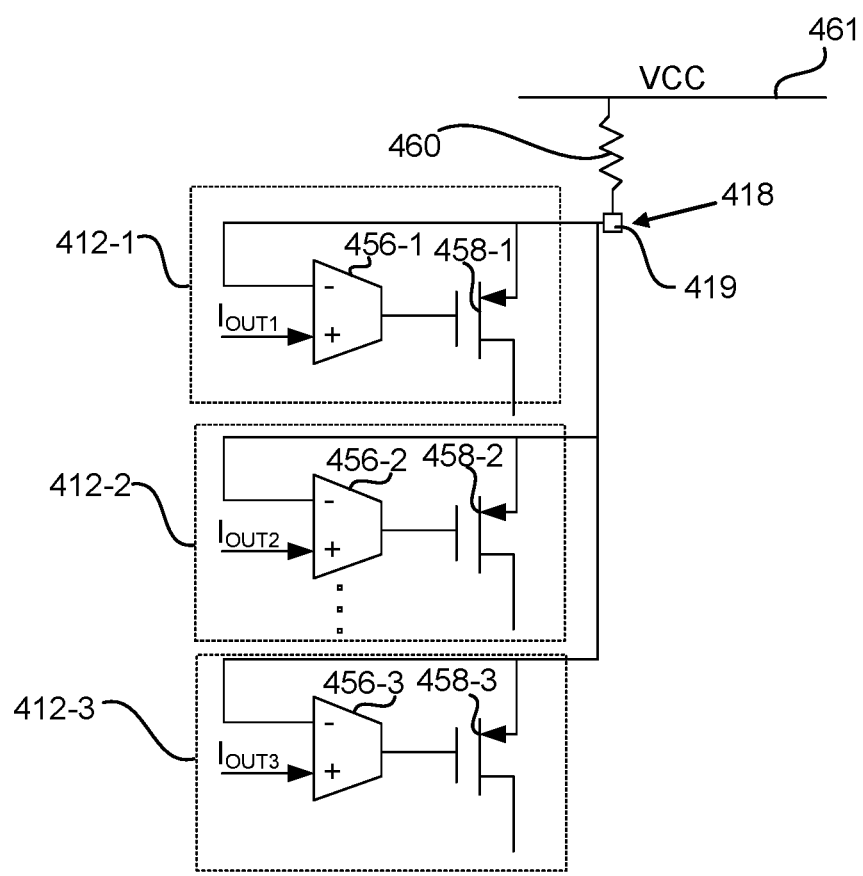
FIG. 4 illustrates an analog implementation of a CS interface according to an aspect.

FIG. 4 illustrates an analog implementation of a CS interface 418 according to an aspect. As shown in FIG. 4, the CS interface 418 may include a dedicated analog pin 419, which is connected to a voltage source 461 (VCC) via a resistor 460. The analog voltage on the dedicated analog pin 419 may indicate the value of the minimum output current ($I_{OUT\_MIN}$).

Each STC module (e.g., each STC module 102 of FIG. 1A) is connected to the dedicated analog pin 419. Each STC module is configured to determine whether the value of its respective output current is less than the value of the current minimum output current ($I_{OUT\_MIN}$), and, if so, provide its output current as the value of the minimum output current ($I_{OUT\_MIN}$) on the dedicated analog pin 419. For example, a first STC module (e.g., the first STC module 102-1 of FIG. 1A) includes a first CS circuitry 412-1, a second STC module (e.g., the second STC module 102-2 of FIG. 1A) includes a second CS circuitry 412-2, and a third STC module (e.g., the third STC module 102-3 of FIG. 1A) includes a third CS circuitry 412-3.

Each of the first CS circuitry 412-1, the second CS circuitry 412-2, and the third CS circuitry 412-3 is connected to the dedicated analog pin 419. The first CS circuitry 412-1, the second CS circuitry 412-2, or the third CS circuitry 412-3 may update the value of the minimum output current ($I_{OUT\_MIN}$), e.g., the voltage on the dedicated analog pin 419. For instance, if the first output current ($I_{OUT1}$) is less than the voltage on the dedicated analog pin 419, the first CS circuitry 412-1 may update the voltage on the dedicated analog pin 419 to correspond to (e.g., to be the same with) the voltage of the first output current ($I_{OUT1}$). If the second output current ($I_{OUT2}$) is less than the voltage on the dedicated analog pin 419, the second CS circuitry 412-2 may update the voltage on the dedicated analog pin 419 to correspond to (e.g., to be the same with) the voltage of the second output current ($I_{OUT2}$). If the third output current ($I_{OUT3}$) is less than the voltage on the dedicated analog pin 419, the third CS circuitry 412-3 may update the voltage on the dedicated analog pin 419 to correspond to (e.g., to be the same with) the voltage of the third output current ($I_{OUT3}$).

The first CS circuitry 412-1 includes an operational transconductance amplifier (OTA) 456-1 and a transistor 458-1. The OTA 456-1 receives and compares the voltage on the dedicated analog pin 419 with the voltage of a first output current ($I_{OUT1}$). The output of the OTA 456-1 is connected to a gate of the transistor 458-1. In some examples, the transistor 458-1 is a P-channel transistor. The source of the transistor 458-1 is connected to the dedicated analog pin 419. The drain of the transistor 458-1 may be connected to ground. If the voltage of the first output current ($I_{OUT1}$) is less than the voltage on the dedicated analog pin 419, the OTA 456-1 may activate the transistor 458-1 so that the voltage of the first output current ($I_{OUT1}$) is the voltage on the dedicated analog pin 419.

The second CS circuitry 412-2 includes an OTA 456-2 and a transistor 458-2. The OTA 456-2 receives and compares the voltage on the dedicated analog pin 419 with the voltage of a second output current ($I_{OUT2}$). The output of the OTA 456-2 is connected to a gate of the transistor 458-2. In some examples, the transistor 458-2 is a P-channel transistor. The source of the transistor 458-2 is connected to the dedicated analog pin 419. The drain of the transistor 458-2 may be connected to ground. If the voltage of the second output current ($I_{OUT2}$) is less than the voltage on the dedicated analog pin 419, the OTA 456-2 may activate the transistor 458-2 so that the voltage of the second output current ($I_{OUT2}$) is the voltage on the dedicated analog pin 419.

The third CS circuitry 412-3 includes an OTA 456-3 and a transistor 458-3. The OTA 456-3 receives and compares the voltage on the dedicated analog pin 419 with the voltage of a third output current ($I_{OUT3}$). The output of the OTA 456-3 is connected to a gate of the transistor 458-3. In some examples, the transistor 458-3 is a P-channel transistor. The source of the transistor 458-3 is connected to the dedicated analog pin 419. The drain of the transistor 458-3 may be connected to the ground. If the voltage of the third output current ($I_{OUT3}$) is less than the voltage on the dedicated analog pin 419, the OTA 456-3 may activate the transistor 458-3 so that the voltage of the third output current ($I_{OUT3}$) is the voltage on the dedicated analog pin 419.

Figure 5:
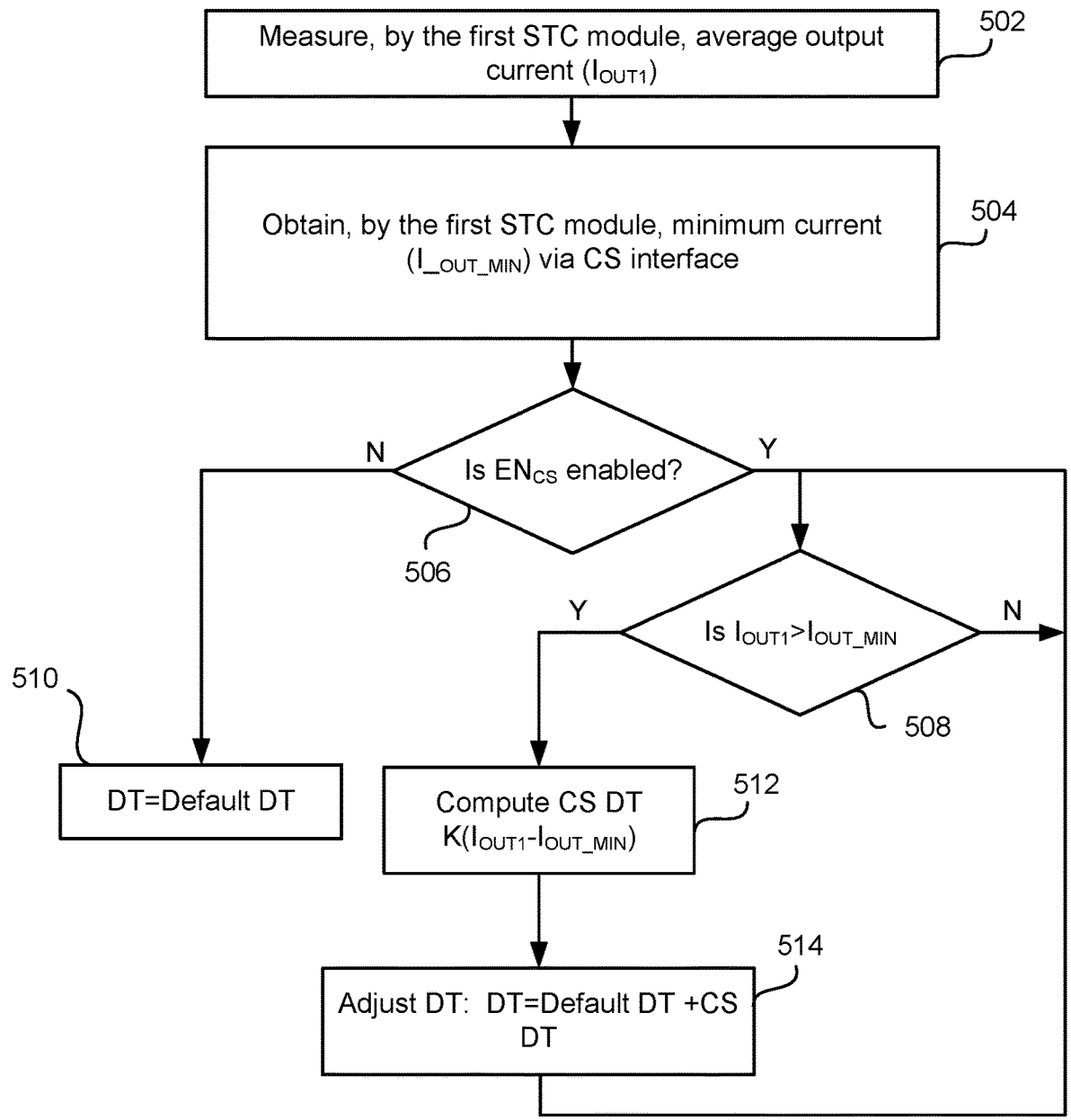
FIG. 5 illustrates a flowchart depicting example operations of a STC module according to an aspect.

FIG. 5 illustrates a flowchart 500 depicting example operations of a STC module according to an aspect. Although the operations of FIG. 5 are explained with reference to the first SCT module 102-1 of FIGS. 1A and 1B, the operations may be applicable to any of the STC modules discussed herein.

In operation 502, the first STC module 102-1 may measure the average output current ($I_{OUT1}$) generated by the first STC module 102-1. In operation 504, the first STC module 102-1 may obtain the value of the minimum output current ($I_{OUT\_MIN}$) via the CS interface 118. In operation 506, the first STC module 102-1 may determine if the CS enable signal ($EN_{CS}$) is received. If no, in operation 510, the dead time 116 is the default dead time 115. If yes, in operation 508, the first STC module 102-1 determines whether the value of the first output current ($I_{OUT1}$) is greater than the value of the minimum output current ($I_{OUT\_MIN}$), and the operations return to operation 508 to re-determine (e.g., periodically or continuously) whether the value of the first output current ($I_{OUT1}$) is greater than the value of the minimum output current ($I_{OUT\_MIN}$). If yes, in operation 512, the first STC module 102-1 computes the CS dead time 117. In some examples, the first STC module 102-1 computes the CS dead time 117 based on the difference between the value of the first output current ($I_{OUT1}$) and the value of the minimum output current ($I_{OUT\_MIN}$), which is multiple by a parameter K (e.g., $K*(I_{OUT1}-I_{OUT\_MIN})$). In operation 514, the first STC module 102-1 adjusts the dead time 116 by adding the CS dead time 117 to the default dead time 115.

Figure 6:
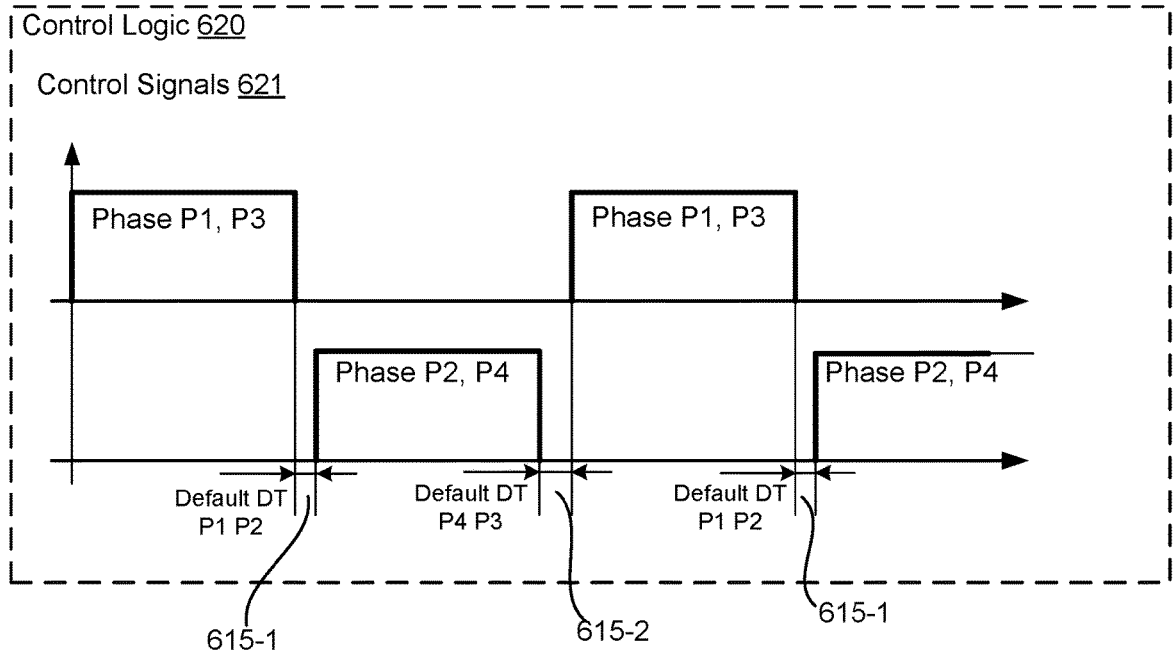
FIG. 6 illustrates control signals of a control logic of the STC module without the current share mechanism enabled according to an aspect.

FIG. 6 illustrates control signals 621 of a control logic 620 without the current share mechanism enabled according to an aspect. For example, the control signals 621 may depict the enabling of the STC phases in response to the CS control signal ($EN_{CS}$) being disabled. The control logic 620 may be an example of the control logic 120 of FIG. 1B. In some examples, with respect to a particular STC module, the first STC phase and the third STC phase may be activated simultaneously, and the second STC phase and the fourth STC phase may be activated simultaneously. The control signals 621 are provided to the STC circuit (e.g., the STC circuit 106 of FIG. 1B) to control the switches (e.g., the switches 107 of FIG. 1B) to implement the various STC phases of the STC module. For example, with respect to the STC circuit 206 of FIG. 2, the control signals 621 may include signals to control the transistors (Q1 through Q10) to implement the first through fourth STC phases.

An STC cycle may include the activation of the first and third STC phases followed by the activation of the second and fourth STC phases, which is followed by another STC cycle. As shown in FIG. 6, a default dead time 615-1 (e.g., the default dead time 115 of FIG. 1B) may be provided within a particular STC cycle, e.g., after the period of time in which the first and third STC phases are activated but before activation of the second and fourth STC phases. In addition, in some examples, a default dead time 615-2 (e.g., the default dead time 115 of FIG. 1B) may be provided at the end of a particular STC cycle but before the activation of a subsequent STC cycle, e.g., after the activation of the second and fourth STC phases before the activation of the first and third STC phases in the next STC phase.

Figure 7A:
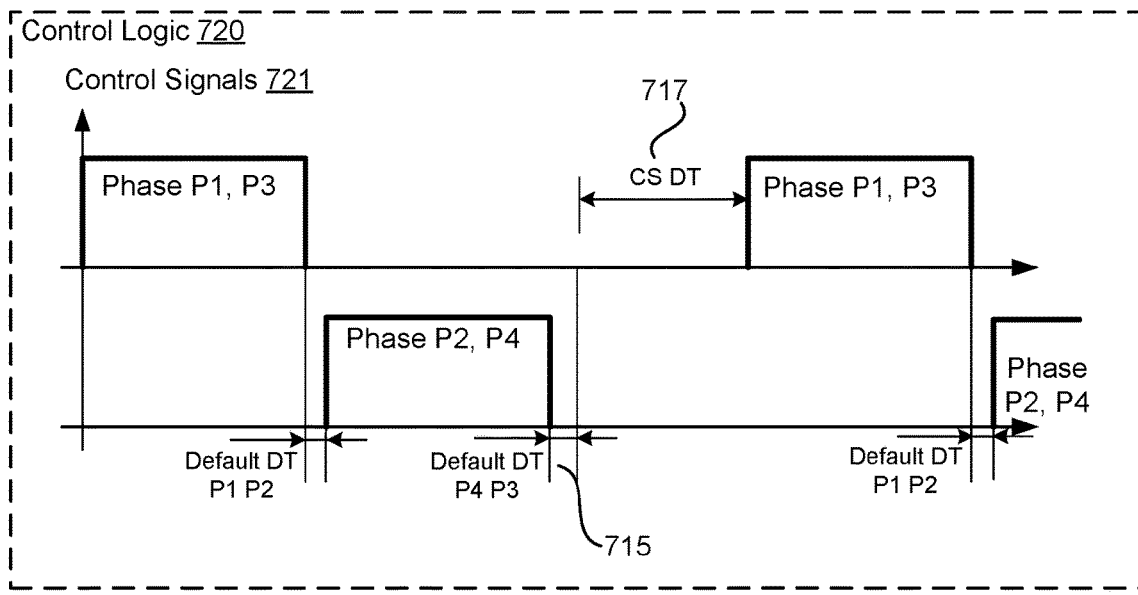
FIG. 7A illustrates control signals for a control logic of the STC module with the current sharing mechanism enabled according to an aspect.

FIG. 7A illustrates control signals 721 for a control logic 720 with the current sharing mechanism enabled according to an aspect. The control logic 720 may be an example of the control logic 120 of FIG. 1A. The control signals 721 may depict the enabling of the STC phases in response to the CS control signal ($EN_{CS}$) being enabled according to an aspect.

With respect to a particular STC module, the first STC phase and the third STC phase may be activated simultaneously, and the second STC phase and the fourth STC phase may be activated simultaneously. The control signals 721 are provided to the STC circuit (e.g., the STC circuit 106 of FIG. 1B) to control the switches (e.g., the switches 107 of FIG. 1B) to implement the various STC phases of the STC module. For example, with respect to the STC circuit 206 of FIG. 2, the control signals 721 may include signals to control the transistors (Q1 through Q10) to implement the first through fourth STC phases.

An STC cycle may include the activation of the first and third STC phases followed by the activation of the second and fourth STC phases, which is followed by another STC cycle. As shown in FIG. 7A, a current share (CS) dead time 717 (e.g., the CS dead time 117 of FIG. 1B) is added to a default dead time 715 (e.g., the default dead time 115 of FIG. 1B) at the end of an STC cycle. For example, after the disabling (or deactivation) of the second and fourth STC cycles, the updated dead time includes the CS dead time 717 plus the default dead time 715.

Figure 7B:
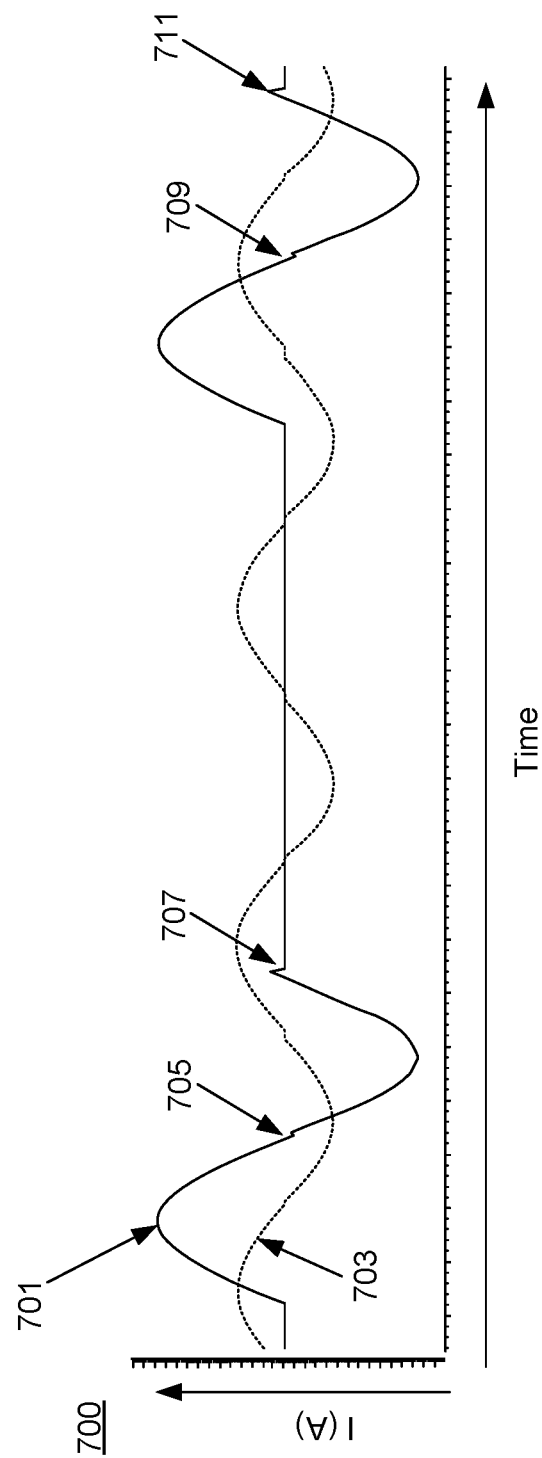
FIG. 7B illustrates a graph depicting current waveforms of two STC modules according to an aspect.

FIG. 7B illustrates a graph 700 depicting current waveforms of two STC modules within its resonant tank according to an aspect. For example, the current waveforms of FIG. 7B relate to the addition of the CS dead time at the end of the STC cycle as shown in FIG. 7A. The graph 700 includes a first current waveform 701 generated by a first STC module (e.g., the first STC module 102-1 of FIGS. 1A and 1B), and a second current waveform 703 generated by a second STC module (e.g., the second STC module 102-2 of FIG. 1A). In the example of FIG. 7B, the first STC module has added the CS dead time at the end of the STC cycle. In addition, despite the addition of the CS dead time, the first STC module may still enable zero-current switching (ZCS) as indicated by points 705, 707, 709, and 711, thereby increasing the efficiency of the power converter.

Figure 8A:
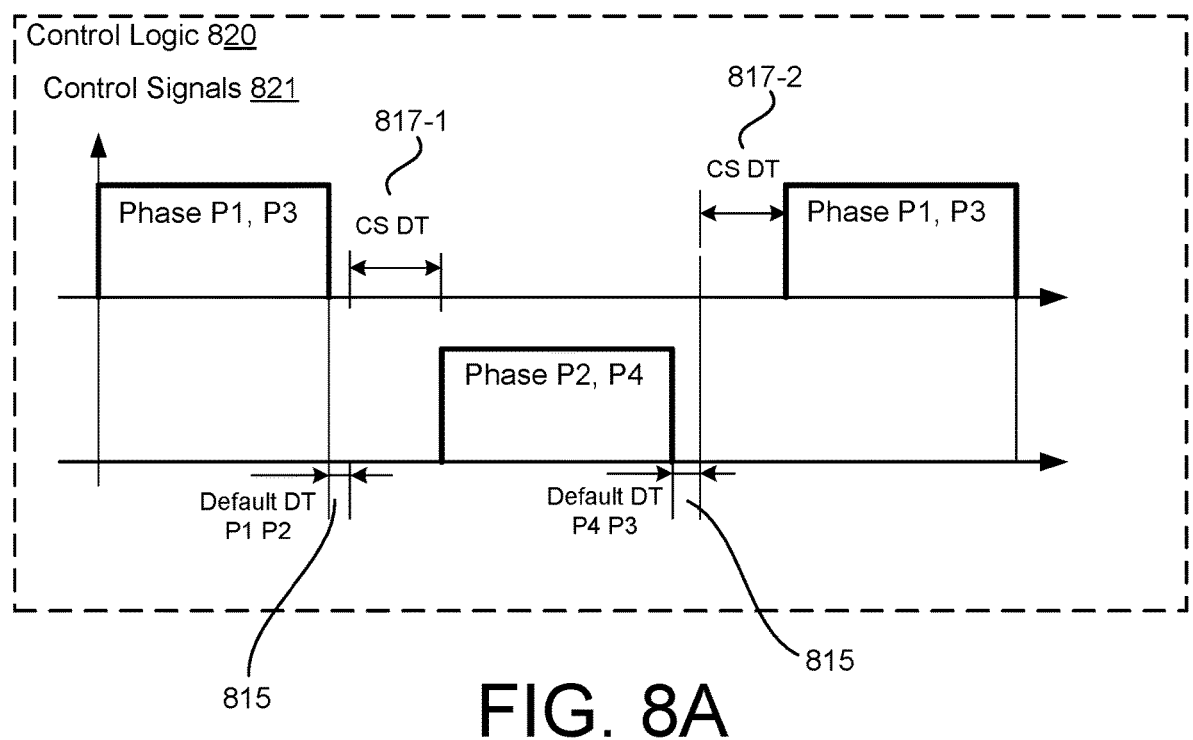
FIG. 8A illustrates control signals for a control logic of the STC module with the current sharing mechanism enabled according to another aspect.

FIG. 8A illustrates control signals 821 for a control logic 820 with current sharing mechanism enabled according to an aspect. The control logic 820 may be an example of the control logic 120 of FIG. 1A. The control signals 821 may depict the enabling of the STC phases in response to the CS control signal ($EN_{CS}$) being enabled according to an aspect, where a CS dead time is added after each STC phase (e.g., as opposed to being added just at the end of the STC cycle as shown in FIG. 7A).

With respect to a particular STC module, the first STC phase and the third STC phase may be activated simultaneously, and the second STC phase and the fourth STC phase may be activated simultaneously. The control signals 821 are provided to the STC circuit (e.g., the STC circuit 106 of FIG. 1B) to control the switches (e.g., the switches 107 of FIG. 1B) to implement the various STC phases of the STC module. For example, with respect to the STC circuit 206 of FIG. 2, the control signals 821 may include signals to control the transistors (Q1 through Q10) to implement the first through fourth STC phases.

An STC cycle may include the activation of the first and third STC phases followed by the activation of the second and fourth STC phases, which is followed by another STC cycle. As shown in FIG. 8A, a CS dead time is added to a default dead time 815 at the end of each STC phase. In some examples, the control logic 820 may divide (e.g., split) the computed CS dead time into a CS dead time 817-1 and a CS dead time 817-2. As shown in FIG. 8A, the CS dead time 817-1 may be added to the default dead time 815 after the deactivation of the first and third STC phases, and the CS dead time 817-2 may be added to the default dead time 815 after the deactivation of the second and fourth STC phases.

Figure 8B:
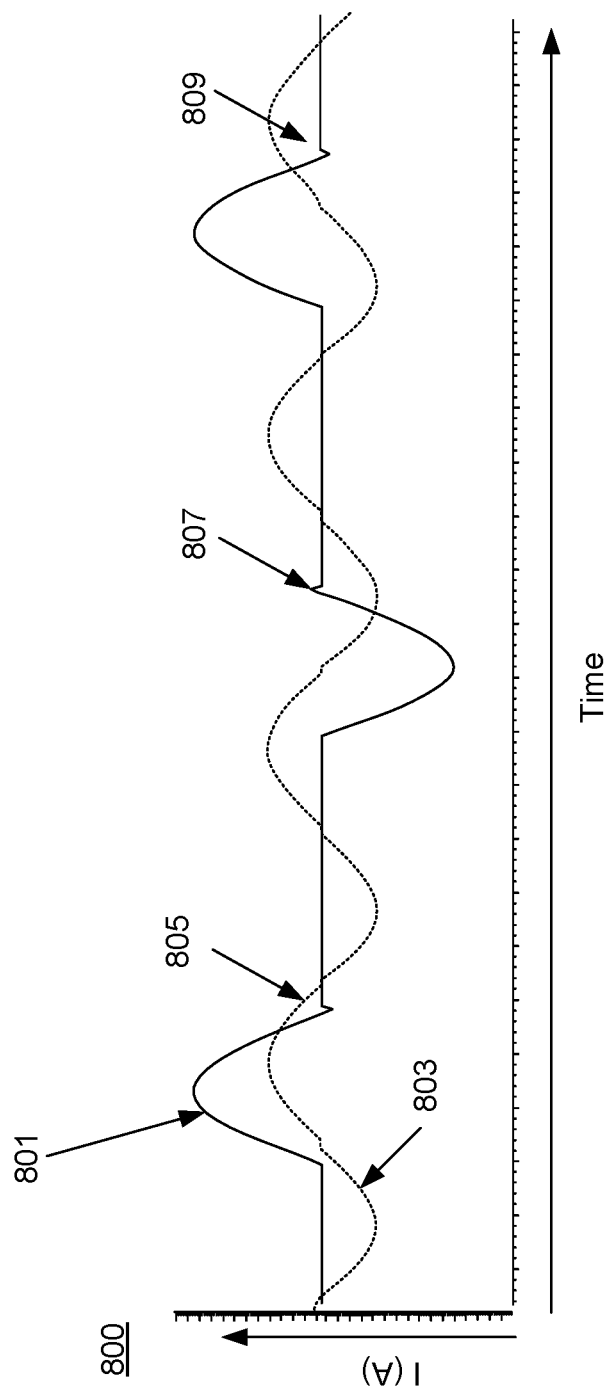
FIG. 8B illustrates a graph depicting current waveforms of two STC modules according to another aspect.

FIG. 8B illustrates a graph 800 depicting current waveforms of two STC modules within its resonant tank according to an aspect. For example, the current waveforms of FIG. 8B relate to the addition of the CS dead time at the end of each STC phase as shown in FIG. 8A. The graph 800 includes a first current waveform 801 generated by a first STC module (e.g., the first STC module 102-1 of FIGS. 1A and 1B), and a second current waveform 803 generated by a second STC module (e.g., the second STC module 102-2 of FIG. 1A). In the example of FIG. 8B, the first STC module has added the CS dead time at the end of each STC cycle. In addition, despite the addition of the CS dead time, the first STC module may still enable zero-current switching (ZCS) as indicated by points 805, 807, and 809, thereby increasing the efficiency of the power converter.

Figure 9:
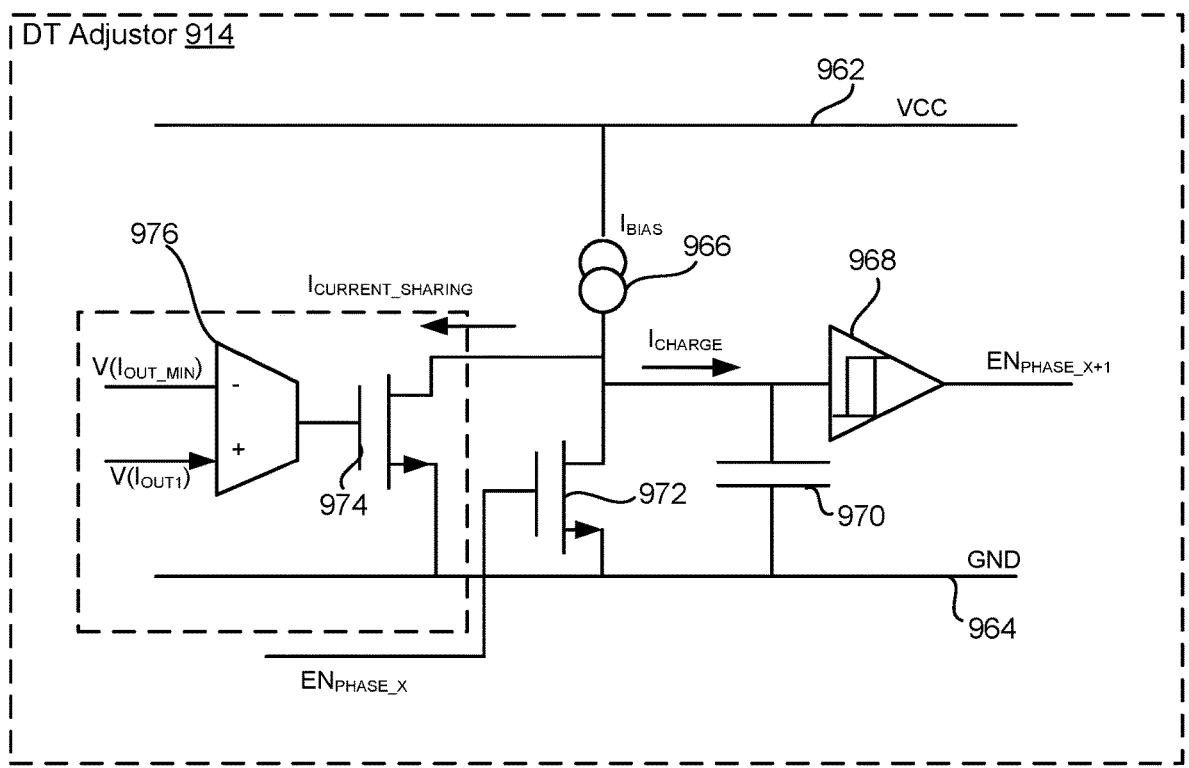
FIG. 9 illustrates an analog implementation of a dead time (DT) adjustor of the STC module according to an aspect.

FIG. 9 illustrates an example of an analog implementation of a DT adjustor 914 according to an aspect. The DT adjustor 914 may be an example of the DT adjustor 114 of FIG. 1B. Generally, the DT adjustor 914 may compare the value of the first output current ($I_{OUT1}$) with the value of the minimum output current ($I_{OUT\_MIN}$), and, if the first output current ($I_{OUT1}$) is greater than the minimum output current ($I_{OUT\_MIN}$), the DT adjustor 914 adjusts the dead time (DT) based on the difference of the first output current ($I_{OUT1}$) and the minimum output current ($I_{OUT\_MIN}$) for the next STC cycle (e.g., $EN_{PHASE\_X+1}$). In some examples, the DT adjustor 914 is configured to increase the dead time at the end of each STC phase. In some examples, the DT adjustor 914 is a circuit that can adjust the deadtime with an OTA sinking current from dead time delay ramp.

The DT adjustor 914 includes an OTA 976, a transistor 974, a current source 966, a voltage source 962, a transistor 972, a capacitor 970, and a Schmitt trigger 968. The OTA 976 compares the voltage of the minimum output current ($I_{OUT\_MIN}$) (referred to as $V(I_{OUT\_MIN})$) and the voltage of the first output current ($I_{OUT1}$) (referred to as $V(I_{OUT\_MIN})$). The output of the OTA 976 is coupled to the gate of the transistor 974. The drain of the transistor 974 is connected to the current source 966, and the source of the transistor 974 may be coupled to a ground 964. In some examples, the transistor 974 is an N-channel transistor. The current source 966 is connected to the voltage source 962 and is configured to provide a bias current ($I_{BIAS}$). If $V(I_{OUT\_MIN})$ is greater than $V(I_{OUT\_MIN})$, the OTA 976 activates the transistor 974. The gate of the transistor 972 receives a phase enable signal ($EN_{PHASE\_X}$), the source of the transistor 972 is coupled to the ground 964, and the drain of the transistor 972 is connected to the current source 966. The capacitor 970 is connected to the input of the Schmitt trigger 968 and the ground 964. The input of the Schmitt trigger 968 is connected to the current source 966 and the capacitor 970. The output of the Schmitt trigger 968 is a next phase enable signal ($EN_{PHASE\_X+1}$), which is delayed by the CS dead time.

The output of the Schmitt trigger 968 may transition to a logic high state in response to the voltage on the capacitor 970 reaching a certain Schmitt trigger threshold $V_{TH}$. The time from when the voltage on the capacitor 970 reaches the Schmitt trigger threshold $V_{TH}$ may be $DT=C*V_{TH}/I_{CHARGE}$, and $I_{CHARGE}=(I_{BIAS}-I_{CURRENT\_SHARING})$. The current $I_{CURRENT\_SHARING}$ is the current sinked by the transistor 974, which is $K*(V(I_{OUT1})-V(I_{OUT\_MIN}))$ when $V(I_{OUT1})$ is higher than $V(I_{OUT\_MIN})$. Therefore, $DT_{CS}$ (current sense deadtime)=$C*V_{TH}/(I_{BIAS}-K*(V(I_{OUT1})-V(I_{OUT\_MIN}))$. This DT value may increase in response to the $V(I_{OUT1})$ being different from $V(I_{OUT\_MIN})$. Also, no changes may occur on the DT in response to the $V(I_{OUT1})$ being less than $V(I_{OUT\_MIN})$. In this case, the DT is the default, which is $DT_{DEFAULT}=C*V_{TH}/(I_{BIAS})$. This timing may start in response to the signal $EN_{PHASE\_X}$ transitioning to a logic low state, where the capacitor 970 is enabled to be charged because the transistor 972 is deactivated (e.g., turned-off), and the DT adjustor 914 can generate the enable signal ($EN_{PHASE\_X+1}$) for the next STC phase.

Figure 10:
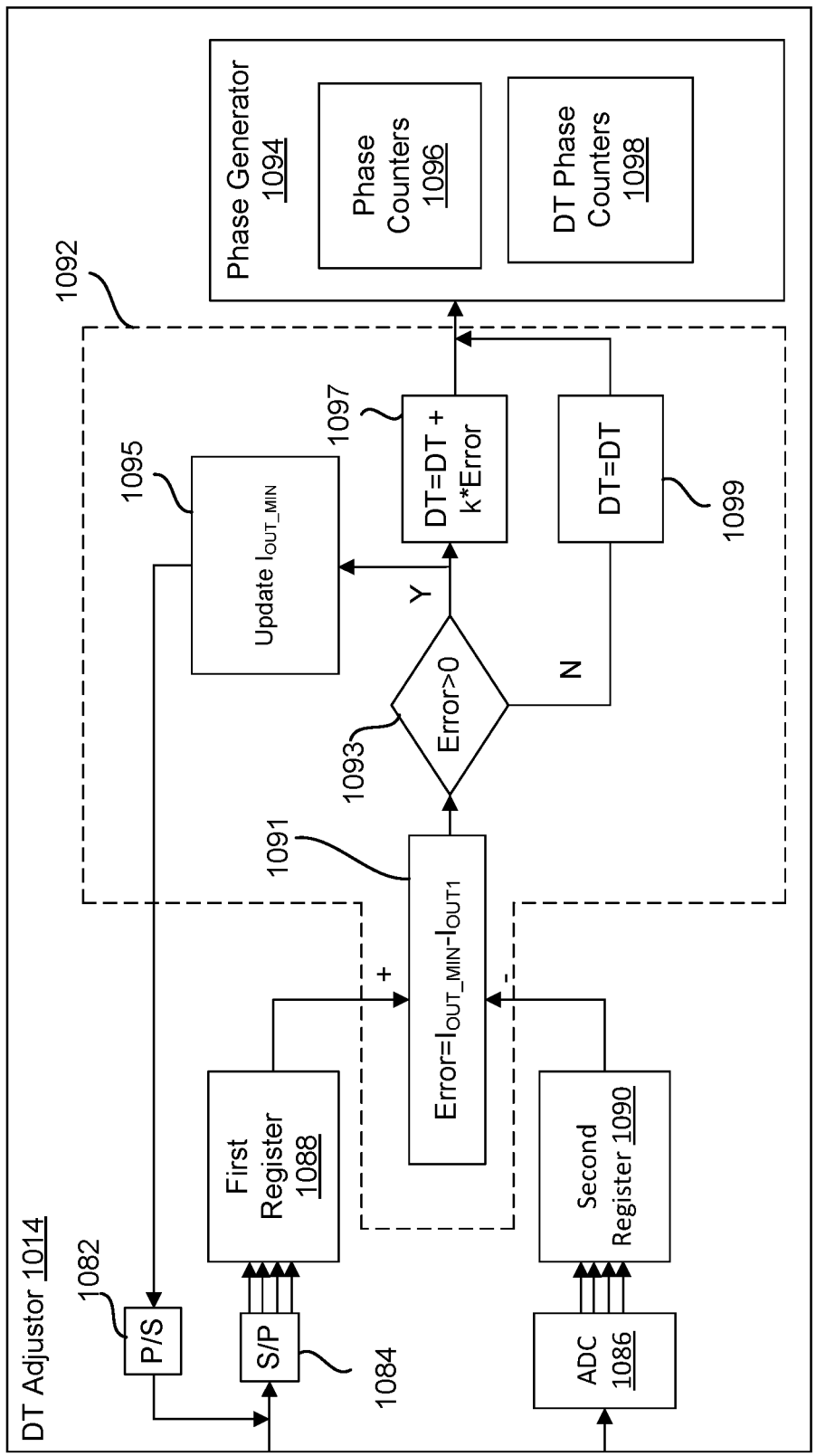
FIG. 10 illustrates a digital implementation of a DT adjustor of the STC module according to an aspect.

FIG. 10 illustrates an example of a digital implementation of a DT adjustor 1014. The DT adjustor 1014 may be an example of the DT adjustor 114 of FIG. 1B and may include any of the details discussed herein. In some examples, the DT adjustor 1014 is a digital finite state machine.

The DT adjustor 1014 includes a parallel to serial (P/S) converter 1082, a serial to parallel (S/P) converter 1084, a first register 1088, an analog-to-digital converter (ADC) 1086, a second register 1090, a digital processor 1092, and a phase generator 1094. The S/P converter 1084 may receive the value of the minimum output current ($I_{OUT\_MIN}$) via the CS interface (e.g., the digital communication line(s) 319 of FIG. 3A). In some examples, the S/P converter 1084 is connected to the digital communication lines, which includes serial digital (e.g., N-bits) data representing the value of the minimum output current ($I_{OUT\_MIN}$). The S/P converter 1084 converts the digital value of the minimum output current ($I_{OUT\_MIN}$) from the serial format to the parallel format. The first register 1088 stores the N-bits of the digital value of the minimum output current ($I_{OUT\_MIN}$).

The ADC 1086 may receive the first output current ($I_{OUT1}$) which is an analog format. For example, the ADC 1086 may be connected to the OC measuring circuit (e.g., the OC measuring circuit 108 of FIG. 1B). The ADC 1086 converts the analog value of the first output current ($I_{OUT1}$) to a digital value. The second register 1090 is connected to the output of ADC 1086, and the ADC 1086 stores the digital value of the first output current ($I_{OUT1}$).

The digital processor 1092 reads the digital value of the minimum output current ($I_{OUT\_MIN}$) from the first register 1088 and the digital value of the first output current ($I_{OUT1}$) from the second register 1090, and, in operation 901, subtracts the value of the first output current ($I_{OUT1}$) from the value of the minimum output current ($I_{OUT\_MIN}$) to obtain a result (e.g., error value). In operation 1093, the digital processor 1092 determines whether the result (e.g., the error value) is above a threshold (e.g., zero). If yes, in operation 1095, the digital processor 1092 updates the value of the minimum output current ($I_{OUT\_MIN}$) to be the value of the first output current ($I_{OUT1}$), which is provided to the P/S converter 1082 to change the information to the serial format to be placed on the CS interface (e.g., the digital communication line(s)). Also, if yes, in operation 1097, the digital processor 1092 computes the dead time. For example, the digital processor 1092 computes the dead time (DT) as the default dead time plus the CS dead time. The CS dead time is the difference of $I_{OUT1}$ and $I_{OUT\_MIN}$, multiplied by the parameter K. The computed deadtime is provided to the phase generator 1094. If no, the digital processor 1092 determines the dead time as the default dead time, which is provided to the phase generator 1094.

In some examples, the phase generator 1094 is included as part of the DT adjustor 1014. In some examples, the phase generator 1094 is included as part of the control logic (e.g., the control logic 120 of FIG. 1B). The phase generator 1094 may include one or more phase counters 1096, and one or more dead time (DT) phase counters 1098. A phase counter 1096 may include an n-bit counter driven with an internal clock in order to count phase delays. A DT phase counter 1098 may include an n-bit counter driven with an internal clock in order to count dead time delays. If the internal clock is operating at 200 Mhz to drive the control logic, a counter (e.g., a phase counter 1096 or DT phase counter 1098) can count delays with a tick of 5 ns. For a first phase P1 with a duration of 1 us, the phase generator 1094 may set the end of the counter to be equal to 1000 ns/5 ns=200 Decimal. After the phase P1 is counted, the phase generator 1094 resets the counter, and updates the end of the counter register with a new digital value related to the duration of the delay DT. For example, if a DT is set equal to 100 ns, the phase generator 1094 sets the end of counter equal to 100 n/5 ns=20. If current sharing is active and the DT is determined to be increase, the phase generator 1094 updates the end of counter from the default of 20 to the new value. If the new DT is 150 ns, the phase generator 1094 changes the end of counter from 20 to 30 (150 ns/5 ns). After the DT is set, the end of counter is set to obtain the second phase P2, and the DT is set again, and so forth.

Figure 11:
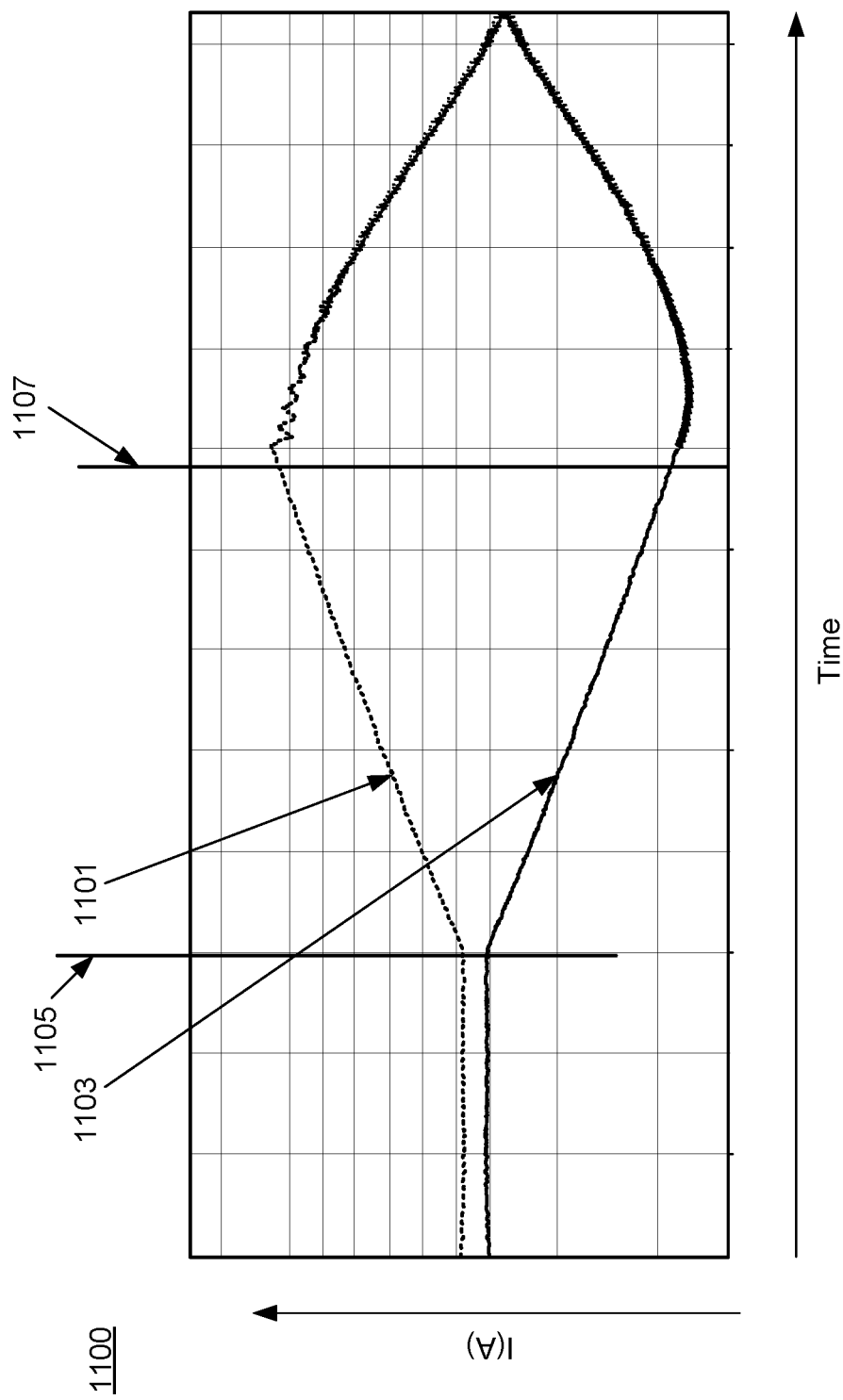
FIG. 11 illustrates a graph depicting output currents from two STC modules according to an aspect.

FIG. 11 illustrates a graph 1100 depicting a first output current 1101 (e.g., from a first STC module) and a second output current 1103 (e.g., from a second STC module) with respect to time according to an aspect. For example, the second STC module may be considered the weaker module (e.g., providing less output current) while the first STC module may be considered the stronger module (e.g., providing more output current). At the beginning and until a line 1105, the first and second STC modules are operating independently. The line 1105 indicates a point in time in which the first and second STC modules are connected in parallel (but without the current sharing mechanism enabled). A line 1107 illustrates a point in time in which the current sharing mechanism is activated. As shown in FIG. 11, after the first and second STC modules are connected in parallel (e.g., after the line 1105), the first output current 1101 and the second output current 1103 begin to diverge, thereby providing unequal current. However, when the current sharing mechanism is activated (at line 1105), the first output current 1101 and the second output current 1103 begin to converge toward each other, which eventually results in the first output current 1101 and the second output current 1103 having substantially the same value.

Figure 12A:
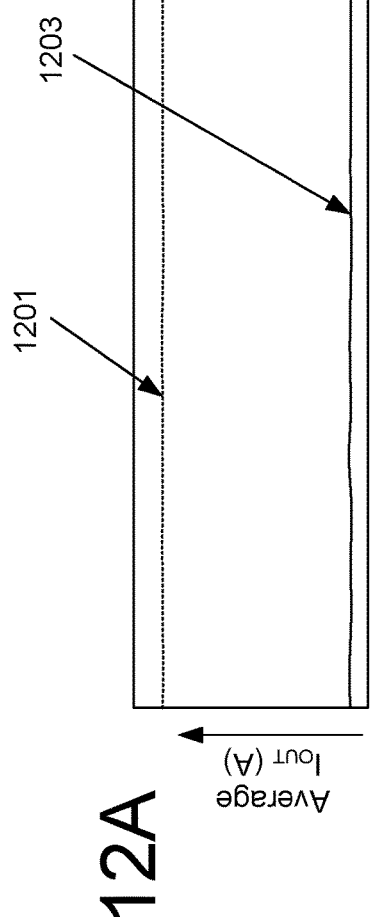
FIGS. 12A through 12C illustrate various signals of a non-regulated converter without the current share mechanism enabled according to an aspect.
Figure 12B:
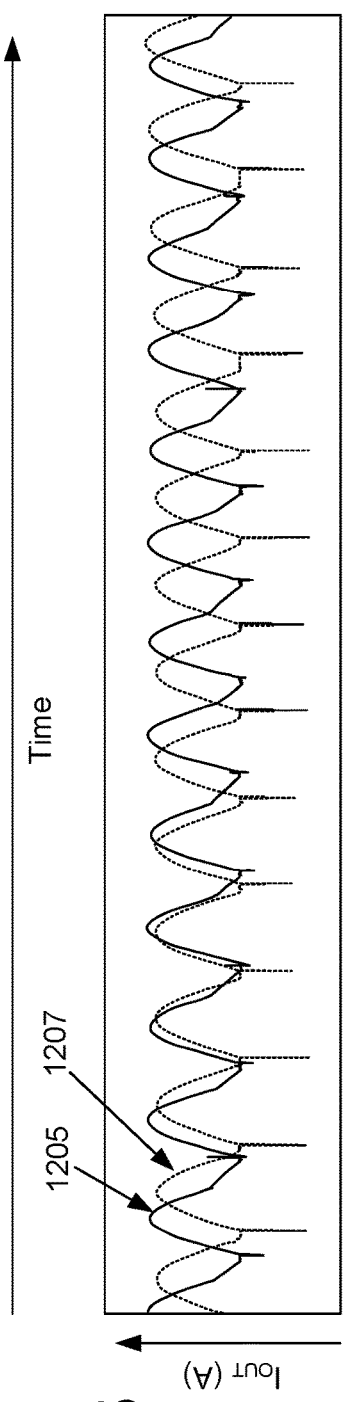
Figure 12C:
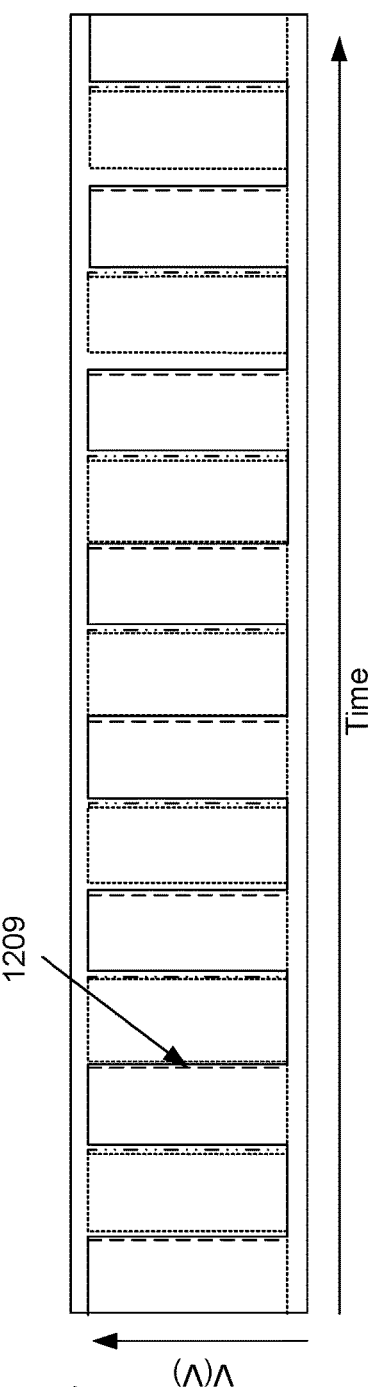

FIGS. 12A through 12C illustrate various signals of a non-regulated converter without the current share mechanism enabled according to an aspect. For example, FIG. 12A depicts a first average output current 1201 (e.g., generated by a first STC module) and a second average output current 1203 (e.g., generated by a second STC module connected in parallel with the first STC module) over time. FIG. 12B illustrates a first output current waveform 1205 (e.g., generated by the first STC module) and a second output current waveform 1207 (e.g., generated by the second STC module). FIG. 12C illustrate control signals 1209 that enable the STC phases of the STC modules. As shown in FIG. 12A, the first average output current 1201 is mismatched (e.g., not substantially equal) from the second average output current 1203, which can negatively affect the performance of a power converter with STC modules. Also, as shown in FIG. 12C, the default dead time provided between the phases is relatively small.

Figure 13A:
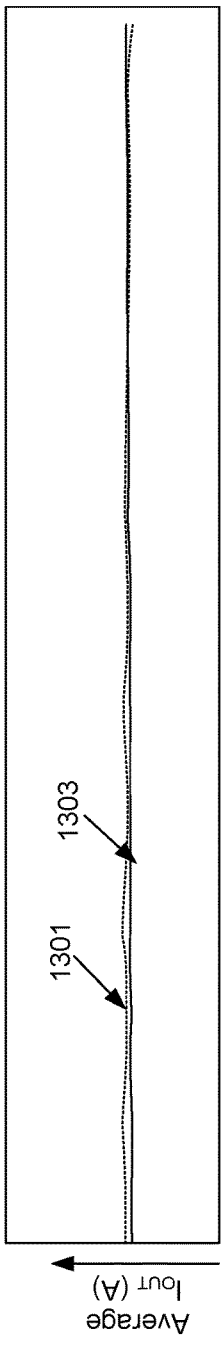
FIGS. 13A through 13C illustrate various signals of a non-regulated converter with the current share mechanism enabled according to an aspect.
Figure 13B:
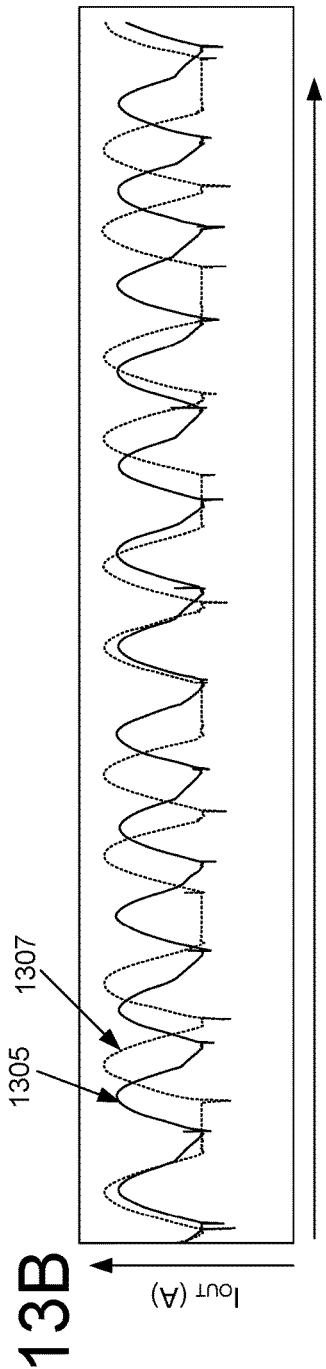
Figure 13C:
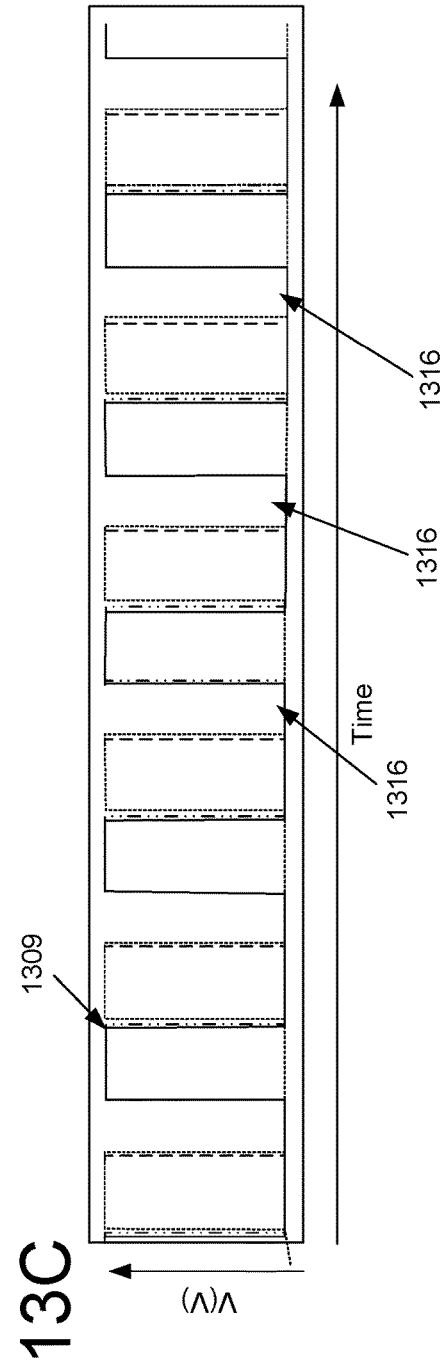

FIGS. 13A through 13C illustrate the effects of a STC converter with the current share mechanism enabled according to an aspect. For example, FIG. 13A depicts a first average output current 1301 (e.g., generated by a first STC module) and a second average output current 1303 (e.g., generated by a second STC module connected in parallel with the first STC module) over time. FIG. 13B illustrates a first output current waveform 1305 (e.g., generated by the first STC module) and a second output current waveform 1307 (e.g., generated by the second STC module). FIG. 13C illustrate control signals 1309 that enable the STC phases of the STC modules. As shown in FIG. 13A, the first average output current 1301 is matched (e.g., substantially equal) to the second average output current 1303, which can improve the performance of a power converter with STC modules. Also, as shown in FIG. 13C, the CS dead time 1316 is added at the end of the STC cycles.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A power converter, comprising:
 a plurality of switching tank converter (STC) modules configured to be connected in parallel and to a load, the plurality of STC modules not including a voltage feedback loop, the plurality of STC modules including a first STC module and a second STC module, the first STC module including:
 an output current (OC) measuring circuit configured to measure a value of a first output current generated by the first STC module;
 a digital interface configured to transfer a value of a minimum output current provided by the plurality of STC modules;
 a dead time (DT) adjustor configured to compare the value of the first output current with the value of the minimum output current provided by the plurality of STC modules, the DT adjustor configured to adjust a dead time in response to the value of the first output current being greater than the value of the minimum output current; and
 a current share (CS) circuit configured to transmit, via the digital interface, the value of the first output current in response to the value of the first output current being less than the value of the minimum output current.

2. The power converter of claim 1, wherein the DT adjustor is configured to determine a CS dead time based on a difference of the minimum output current and the first output current, the DT adjustor configured to increase the dead time by the CS dead time.

3. The power converter of claim 1, wherein the first STC module includes:
an STC circuit including one or more resonant capacitors, one or more resonant inductors, and a plurality of switches.

4. The power converter of claim 3, wherein the first STC module includes:
a control logic configured to generate one or more control signals to control the plurality of switches such that the dead time is inserted at an end of an STC phase or at an end of an STC cycle, the dead time being a period of time which the plurality of switches are deactivated.

5. The power converter of claim 1, wherein the value of the minimum output current includes digital data.

6. The power converter of claim 1, wherein the digital interface includes one or more digital communication lines connected between the plurality of STC modules.

7. The power converter of claim 1, wherein the digital interface includes a digital serial interface configured to serially transmit digital data among the plurality of STC modules.

8. The power converter of claim 1, wherein, in response to the value of the first output current being less than the value of the minimum output current, the CS circuit is configured to store the value of the first output current as the minimum output current in a memory device.

9. A power converter comprising:
a plurality of switching tank converter (STC) modules configured to be connected in parallel and to a load, the plurality of STC modules not including a voltage feedback loop, the plurality of STC modules including a first STC module and a second STC module; and
a digital interface connected to the plurality of STC modules, the digital interface configured to share a value of a minimum output current with each STC module, the value of the minimum output current being a minimum of a first output current generated by the first STC module and a second output current generated by the second STC module,
in response to a value of the first output current being greater than the value of the minimum output current, the first STC module configured to increase a dead time;
the first STC module configured to convert an input voltage to a first output voltage during a plurality of STC cycles, wherein an individual STC cycle includes a plurality of STC phases where each STC phase is configured to generate a different resonant frequency, the first STC module configured to increase the dead time between temporally adjacent STC phases within the individual STC cycle.

10. A power converter, comprising:
a plurality of switching tank converter (STC) modules configured to be connected in parallel and to a load, the plurality of STC modules not including a voltage feedback loop, the plurality of STC modules including a first STC module and a second STC module; and
a digital interface connected to the plurality of STC modules, the digital interface configured to share a value of a minimum output current with each STC module, the value of the minimum output current being a minimum of a first output current generated by the first STC module and a second output current generated by the second STC module,
in response to a value of the first output current being less than the value of the minimum output current, the first STC module configured to transmit, via the digital interface, the value of the first output current to the second STC module,
in response to the value of the first output current being greater than the value of the minimum output current, the first STC module configured to increase a dead time.

11. The power converter of claim 10, wherein the first STC module includes:
an STC circuit including one or more resonant capacitors, one or more resonant inductors, and a plurality of switches;
an output current (OC) measuring circuit configured to measure the value of the first output current, the OC measuring circuit being coupled to an output node of the STC circuit;
a dead time (DT) adjustor configured to compare the value of the first output current with the value of the minimum output current from the digital interface, the DT adjustor configured to increase the dead time in response to the value of the first output current being greater than the value of the minimum output current; and
a control logic configured to generate control signals for the plurality of switches such that the dead time is added at an end of an STC phase or an STC cycle, the dead time being a period of time which the plurality of switches are deactivated.

12. The power converter of claim 10, wherein the first STC module is configured to convert an input voltage to a first output voltage during a plurality of STC cycles, the plurality of STC cycles including a first STC cycle followed by a second STC cycle, the first STC module configured to increase the dead time between the first STC cycle and the second STC cycle.

13. The power converter of claim 10, wherein the first STC module is configured to determine a current share (CS) dead time based on a difference of the minimum output current and the first output current, wherein the first STC module is configured to increase the dead time by the CS dead time.

14. The power converter of claim 10, wherein the digital interface includes one or more digital serial communication lines connected to the plurality of STC modules.

15. The power converter of claim 10, wherein the digital interface includes a digital serial interface configured to serially transmit digital data among the plurality of STC modules.

16. The power converter of claim 10, wherein, in response to the value of the first output current being less than the value of the minimum output current, the first STC module is configured to store the value of the first output current as the minimum output current in a memory device.

17. A method for controlling a power converter, the method comprising:
measuring, by a first switching tank converter (STC) module connected in parallel with a second STC module, a value of a first output current generated by the first STC module, the first STC module or the second STC module not including a voltage feedback loop;
receiving, by a digital interface, a value of a minimum output current provided by the first STC module and the second STC module;

comparing, by the first STC module, the value of the first output current with the value of the minimum output current;

increasing, by the first STC module, a dead time associated with STC cycles of the first STC module in response to the value of the first output current being greater than the value of the minimum output current; and transmitting, via the digital interface the value of the first output current as the value for the minimum output current in response to the value of the first output current being less than the value of the minimum output current.

18. The method of claim 17, wherein the dead time is inserted at an end of an STC cycle or at an end of an STC phase.

19. The method of claim 17, further comprising:

comparing, by the second STC module, a second output current generated by the second STC module with the minimum output current from the digital interface; and updating, by the second STC module, the minimum output current on the digital interface to correspond to the second output current in response to the second output current being less than the minimum output current.

20. The method of claim 17, wherein the dead time is increased by a value that is proportional to a difference between the first output current and the minimum output current.

* * * * *